(12) United States Patent
Baba et al.

(10) Patent No.: US 7,725,632 B2
(45) Date of Patent: May 25, 2010

(54) COMPUTER SYSTEM AND MANAGEMENT METHOD THEREOF

(75) Inventors: Takashige Baba, Inagi (JP); Jun Okitsu, Kodaira (JP); Yuji Tsushima, Hachioji (JP); Nobuyuki Muranaka, Hachioji (JP); Keitaro Uehara, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 95 days.

(21) Appl. No.: 12/222,225

(22) Filed: Aug. 5, 2008

(65) Prior Publication Data
US 2009/0187694 A1 Jul. 23, 2009

(30) Foreign Application Priority Data
Jan. 18, 2008 (JP) .............................. 2008-009485

(51) Int. Cl.
*G06F 13/00* (2006.01)
(52) U.S. Cl. ..................... 710/104; 710/306; 710/310; 710/316; 709/238; 713/300; 370/408
(58) Field of Classification Search ................. 710/100, 710/104, 306, 310, 312, 316; 709/238; 370/392, 370/401, 408, 412; 713/300
See application file for complete search history.

(56) References Cited

U.S. PATENT DOCUMENTS

| | | | |
|---|---|---|---|
| 6,621,713 B2 | 9/2003 | Amaike et al. | |
| 6,662,242 B2 * | 12/2003 | Holm et al. | .................... 710/9 |
| 6,766,398 B2 * | 7/2004 | Holm et al. | ................. 710/260 |
| 6,996,658 B2 * | 2/2006 | Brocco et al. | ............... 710/312 |
| 7,000,037 B2 * | 2/2006 | Rabinovitz et al. | ............ 710/71 |
| 7,058,738 B2 * | 6/2006 | Stufflebeam, Jr. | ........... 710/104 |
| 7,062,581 B2 * | 6/2006 | Brocco et al. | ............... 710/104 |

(Continued)

FOREIGN PATENT DOCUMENTS

JP     2002-32153     7/2000

OTHER PUBLICATIONS

PCI Special Interest Group. PCI Local Bus Specification. Revision 2.1. Jun. 1, 1995.*

(Continued)

*Primary Examiner*—Mark Rinehart
*Assistant Examiner*—Matthew D Spittle
(74) *Attorney, Agent, or Firm*—Stites & Harbison PLLC; Juan Carlos A. Marquez, Esq.

(57) ABSTRACT

Disclosed herewith is a composite type computer system that can assure that a PCI tree to be allocated to a computer is configured completely before the computer is powered. The composite type computer system includes a PCI switch that connects plural computers through PCI interfaces; plural PCI devices connected to the PCI switch; a system controller that controls the computers; and a PCI manager that controls allocation of the PCI devices to the computers. The system controller carries out processings in the steps of (a) powering an object computer to start up its OS; (b) acquiring the identifier of a PCI tree allocated by the system controller to the computer and PCI tree management information denoting the status of the PCI tree; (c) retrying the powering or canceling the powering of the computer if the acquired PCI tree management information denotes the status "not initialized"; and (d) carrying out the powering for the computer if the acquired PCI management information denotes the status "initialized".

15 Claims, 28 Drawing Sheets

U.S. PATENT DOCUMENTS

| | | | |
|---|---|---|---|
| 7,110,413 B2* | 9/2006 | Riley | 370/401 |
| 7,146,452 B2* | 12/2006 | Brocco et al. | 710/312 |
| 7,219,183 B2* | 5/2007 | Pettey et al. | 710/316 |
| 7,293,129 B2* | 11/2007 | Johnsen et al. | 710/313 |
| 7,320,080 B2* | 1/2008 | Solomon et al. | 713/320 |
| 7,334,071 B2* | 2/2008 | Onufryk et al. | 710/312 |
| 7,356,636 B2* | 4/2008 | Torudbakken et al. | 710/313 |
| 7,363,404 B2* | 4/2008 | Boyd et al. | 710/104 |
| 7,380,046 B2* | 5/2008 | Boyd et al. | 710/316 |
| 7,478,178 B2* | 1/2009 | Torudbakken et al. | 710/31 |
| 7,484,029 B2* | 1/2009 | Boyd et al. | 710/310 |
| 7,529,860 B2* | 5/2009 | Freimuth et al. | 710/8 |
| 7,549,003 B2* | 6/2009 | Boyd et al. | 710/104 |
| 7,571,273 B2* | 8/2009 | Boyd et al. | 710/316 |
| 2003/0009654 A1 | 1/2003 | Nalawadi et al. | |
| 2006/0239287 A1* | 10/2006 | Johnsen et al. | 370/412 |
| 2008/0147887 A1* | 6/2008 | Freimuth et al. | 710/1 |
| 2009/0198862 A1* | 8/2009 | Okitsu et al. | 710/316 |

OTHER PUBLICATIONS

LSI Corporation. Prototyping a PCI Express IOV switch. White Paper. 2007.*

Texas Instruments. PCI Express. Migrate. Integrate. Accelerate. XIO2000A PCI Express bridge chip. 2008.*

"Advanced Switching Technology", Advanced Switching Interconnect SIG, Tech Brief, 2 Pages.

Extended European Search Report for Application No./Patent No. 08013954.6 - 2211, dated Nov. 10, 2008.

* cited by examiner

FIG. 2

| | PHYSICAL HOST IDENTIFIER | VIRTUAL SERVER IDENTIFIER | PCI TREE IDENTIFIER | POWER STATUS | OS/VMM TYPE | PCI TREE STATUS INFORMATION |
|---|---|---|---|---|---|---|
| | K201 | K202 | K203 | K204 | K205 | K206  FT2 |
| G201 | 1 | NA | PT1 | STANDBY | OS x | ENABLE |
| G202 | 2 | NA | PT2, PT3 | ACTIVE | VMM y | ENABLE |
| G203 | 2 | VM1 | NA | ACTIVE | OS y | ENABLE |
| G204 | 2 | VM2 | NA | STANDBY | OS x | DISABLE |
| G205 | 2 | VM3 | NA | INITIALIZING-NOW | OS z | DISABLE |
| G206 | 3 | NA | PT4 | INITIALIZING-NOW | OS z | DISABLE |
| | ... | ... | ... | ... | ... | ... |

FIG. 4

| BUS NUMBER K401 | DEVICE NUMBER K402 | FUNCTION NUMBER K403 | DEVICE TYPE K404 | PCI TREE IDENTIFIER K405 FT4 |
|---|---|---|---|---|
| 0 | 1 | 0 | PCI-PCI BRIDGE | NA |
| 0 | 2 | 0 | NETWORK CONTROLLER | NA |
| 1 | 1 | 0 | PCI-PCI BRIDGE | PT1 |
| 2 | 2 | 0 | PCI-PCI BRIDGE | PT1 |
| 2 | 3 | 0 | PCI-PCI BRIDGE | PT1 |
| 3 | 1 | 0 | NETWORK CONTROLLER | PT1 |
| 4 | 1 | 0 | HOST BUS ADAPTER | PT1 |
| 4 | 1 | 1 | HOST BUS ADAPTER | PT1 |
| ⋮ | ⋮ | ⋮ | ⋮ | ⋮ |

FIG. 6

| BUS NUMBER K401 | DEVICE NUMBER K402 | FUNCTION NUMBER K403 | DEVICE TYPE K404 | PCI TREE IDENTIFIER K405 | VM ALLOCATION K606 FT6 |
|---|---|---|---|---|---|
| 0 | 1 | 0 | PCI-PCI BRIDGE | NA | NA |
| 0 | 1 | 0 | PCI-PCI BRIDGE | NA | NA |
| 0 | 3 | 0 | NETWORK CONTROLLER | NA | NOT ALLOCATED |
| 1 | 1 | 0 | PCI-PCI BRIDGE | PT2 | NA |
| 2 | 2 | 0 | PCI-PCI BRIDGE | PT2 | NA |
| 2 | 3 | 0 | PCI-PCI BRIDGE | PT2 | NA |
| 3 | 1 | 0 | NETWORK CONTROLLER | PT2 | VM1 |
| 4 | 1 | 0 | HOST BUS ADAPTER | PT2 | VM2 |
| 4 | 1 | 1 | HOST BUS ADAPTER | PT2 | NOT ALLOCATED |
| 5 | 1 | 0 | PCI-PCI BRIDGE | PT3 | NA |
| 6 | 2 | 0 | PCI-PCI BRIDGE | PT3 | NA |
| 6 | 3 | 0 | PCI-PCI BRIDGE | PT3 | NA |
| 7 | 1 | 0 | HOST BUS ADAPTER | PT3 | VM1 |
| 8 | 1 | 0 | NETWORK CONTROLLER | PT3 | VM2 |
| 8 | 1 | 1 | NETWORK CONTROLLER | PT3 | VM1 |
| ... | ... | ... | ... | ... | ... |

FIG. 7

| BUS NUMBER (K401) | DEVICE NUMBER (K402) | FUNCTION NUMBER (K403) | DEVICE TYPE (K404) | PCI TREE IDENTIFIER (K405) |
|---|---|---|---|---|
| 0 | 1 | 0 | PCI-PCI BRIDGE | NA |
| 0 | 1 | 0 | PCI-PCI BRIDGE | NA |
| 1 | 1 | 0 | PCI-PCI BRIDGE | PT1 |
| 2 | 2 | 0 | PCI-PCI BRIDGE | PT1 |
| 3 | 1 | 0 | NETWORK CONTROLLER | PT1 |
| 5 | 1 | 0 | PCI-PCI BRIDGE | PT2 |
| 6 | 2 | 0 | PCI-PCI BRIDGE | PT2 |
| 6 | 3 | 0 | PCI-PCI BRIDGE | PT2 |
| 7 | 1 | 0 | HOST BUS ADAPTER | PT2 |
| 8 | 1 | 1 | NETWORK CONTROLLER | PT2 |
| ⋮ | ⋮ | ⋮ | ⋮ | ⋮ |

| SWITCH NO. (K901) | PORT NO. (K902) | PCI TREE IDENTIFIER (K903) | PCI TREE INITIALIZATION STATUS (K904) |
|---|---|---|---|
| 1 | 1 | PT1 | INITIALIZED |
| 1 | 2 | PT2 | INITIALIZED |
| 2 | 1 | PT3 | INITIALIZING-NOW |
| 2 | 2 | PT4 | NOT INITIALIZED |
| ⋮ | ⋮ | ⋮ | ⋮ |

| BUS NUMBER K1001 | DEVICE NUMBER K1002 | FUNCTION NUMBER K1003 | DEVICE TYPE K1004 | PCI TREE IDENTIFIER K1005 | SWITCH NO. K1006 | PORT NO. K1007 |
|---|---|---|---|---|---|---|
| 0 | 1 | 0 | PCI-PCI BRIDGE | NA | 1 | M |
| 0 | 2 | 0 | PCI-PCI BRIDGE | NA | 2 | M |
| 1 | 1 | 0 | PCI-PCI BRIDGE | PT1 | 1 | 1 |
| 1 | 2 | 0 | PCI-PCI BRIDGE | PT2 | 1 | 2 |
| 1 | 3 | 0 | PCI-PCI BRIDGE | PT1 | 1 | 3 |
| 1 | 4 | 0 | PCI-PCI BRIDGE | PT2 | 1 | 4 |
| 1 | 5 | 0 | NETWORK CONTROLLER | PT1, PT2 | 1 | 5 |
| 2 | 1 | 0 | NETWORK CONTROLLER | PT1 | NA | NA |
| 3 | 1 | 0 | NETWORK CONTROLLER | PT2 | NA | NA |
| 4 | 1 | 0 | HOST BUS ADAPTER | PT1 | NA | NA |
| 4 | 1 | 1 | HOST BUS ADAPTER | PT1 | NA | NA |
| 4 | 1 | 2 | HOST BUS ADAPTER | PT2 | NA | NA |
| 4 | 1 | 3 | HOST BUS ADAPTER | PT2 | NA | NA |
| ... | ... | ... | ... | ... | ... | ... |

COMPUTER SYSTEM AND MANAGEMENT METHOD THEREOF

CLAIM OF PRIORITY

The present application claims priority from Japanese patent application JP 2008-009485 filed on Jan. 18, 2008, the content of which is hereby incorporated by reference into this application.

FIELD

The present invention relates to a management technique of a computer system having plural computers and plural PCI devices that are connected to each another through a PCI switch, particularly to a technique that initializes each computer when a PCI device is allocated to the computer, controls the power to the computer, and controls changes of setting of each PCI device allocated to the computer.

BACKGROUND

IT systems typically represented by those of the Internet sites are configured by various servers such as WEB servers that display information to users, AP (application) servers that unite and process information, DB (data base) servers that stores information, etc. Those servers use computers, each being configured by a CPU, a memory, I/O devices, etc. Because such an IT system is configured by many servers as described above, there has appeared a blade server recently so as to make it easier to manage those servers. One blade server includes many computers (e.g., as disclosed in the JP-A No. 2002-32153). Furthermore, because there has been realized a CPU that can include plural processor cores (multicore CPU), thereby the CPU processing performance has been improved and accordingly the CPU has come to be used more efficiently, virtual server techniques have also appeared to operate plural virtual servers in one computer.

Computers use I/O devices such as the NIC (Network Interface Card), the FC-HBA (Fiber Channel-Host Bus Adapter), etc. to connect networks and storages for communications. And as described above, if one computer operates plural servers, the number of I/O devices per computer comes often to be short comparatively. In order to solve such a problem, there are some well-known techniques. The multi-route PCI switching technique and the multi-route I/O virtualization technique (IOV IO Virtualization) are typical ones. The multi-route PCI switching technique enables the connection between plural computers and plural PC devices that are I/O devices and the multi-route I/O virtualization technique enables one PCI device to be shared by plural computers. The former multi-route PCI switching technique can change the number of PCI devices connectable to one computer scalably (e.g., U.S. Pat. No. 7,058,738: "Advanced Switching Technology Tech Brief", issued in 2005, written by ASI-SIG, pages 1 to 2; etc.) The latter multi-route I/O virtualization technique can increase the number of I/O devices virtually by enabling one PC device to be shared among computers. Using those techniques, therefore, can solve the problem of the shortage of I/O devices that might otherwise occur when virtual servers are used.

SUMMARY

In case of the conventional computers as described above, computers and PCI (or PCI Express) devices are connected to each other at one-to-one correspondence fixedly. In the composite type computer system that uses a multi-route PCI switch that enables the connection between plural computers and plural PCI devices, however, the number of computers and the number of PCI devices to be connected to each other are variable. A PCI manager that is a management software program installed in a computer manages the allocation of those PCI devices to those computers.

In spite of this, in case of the conventional controlling method for the allocation of those PCI devices to those computers, the present inventor has found the following problems that might occur when in the following operations in a composite type computer system that uses such a multi-route PCI switch. The problems occur, for example, when in initializing a computer to which a PCI device is to be allocated, controlling the power supply of the computer, and changing the allocation status of the PCI device allocated to the computer.

In a composite type computer system, the PCI manager allocates each PCI device to each computer as follows.

In the initial state of the composite type computer system including computers and a multi-route PCI switch just after it is powered, the PCI devices connected to the multi-route PCI switch are not allocated to any computers yet.

In the first step, the PCI manager searches the topology denoting a connection relationship between the multi-route PCI switch and each PCI device to be allocated. When finding the relationship, the PCI manager goes to the second step to set allocation of each PCI device to the object computer.

The topology differs among computers. Allocation of a PCI device to a computer is made by registering the topology, that is, registering the PCI tree identifier in the multi-route PCI switch or in the register of the multi-route PCI switch. The multi-route PCI switch means a PCI device sharable by plural computers corresponding to the IOV.

On the other hand, a management server or a system controller such as a management module of the composite type computer system controls the power supply of each computer. Thus the PCI tree allocated to a computer is required to be set completely before the computer is powered. Otherwise, the computer cannot be started up in the correct I/O configuration.

When deleting a PCI device allocated to a computer, that is, when resetting the allocation, the PCI manager deletes the identifier of the PCI tree allocated to the computer from the multi-route PCI switch or from the register of the multi-route PCI switch.

On the other hand, because the computer's operating system (OS) and/or the device driver uses PCI devices, if the PCI manager deletes a PCI device while the OS is active, an OS error might occur due to the I/O shut-down. This has been a problem.

Particularly, servers, which often carry out important jobs, are not allowed to invite such errors. This has been an important issue that has had to be avoided.

Under such circumstances, it is an object of the present invention to assure completion of configuring a PCI tree to be allocated to a computer before powering the computer and furthermore to secure both easiness and reliability in operation even for a composite type computer system capable of varying the allocation of PCI devices to computers just like in any conventional computer systems in which PCI devices have been allocated fixedly to computers.

In order to achieve the above object, the present invention provides a composite type computer system and a management method employed for the computer system. The computer system includes plural computers, each having a CPU, a memory, and a PCI interface; one or more PCI switches used to connect the computers through the PCI interfaces; plural PCI devices connected to the PCI switch; system controllers that control the computers; and PCI manager that controls the allocation of the PCI devices to the computers. In such a configuration of system devices and units, the computer system comes to be capable of managing the allocation of those computers and the PCI manager. And according to the management method employed for the composite type computer system, the system controller carries out processings in the following steps; (a) powering one of the computers to start up its operation system; (b) acquiring the identifier of a PCI tree and the management information of the PCI tree, denoting the status of the PCI tree, which denotes the topology of the PCI device allocated to the computer from the PCI manager; (c) retrying the powering of the computer or canceling the powering if the acquired PCI tree management information denotes "being initialized" or "not initialized yet"; and (d) powering the computer if the PCI management information denotes "initialized" with respect to the PCI tree.

Consequently, the present invention can assure that a PCI tree to be allocated to a computer is configured completely before powering the computer, so the computer is started up in the correct PCI device configuration in a composite type computer system configured by plural computers, plural PCI devices, and one or more PCI switches used to connect those computers to those PCI devices.

And accordingly, the present invention comes to be capable of assuring the matching between an actual PCI tree recognized by the operating system, a virtual machine monitor, or the like running in the computer, that is, recognized by the so-called system software and a user set PCI tree.

Furthermore, the present invention can assure that each PCI tree allocated to each computer can be modified whether the system software is active or not.

Furthermore, the user or system manager can enjoy both easiness and reliability in operation just like in conventional computer systems in which PCI devices are allocated to computers fixedly even in a composite type computer system in which PCI devices are allocated to computers variably.

BRIEF DESCRIPTION OF THE DRAWINGS

FIG. 2 is an example of the table of the physical host management information of the composite type computer system in the first embodiment of the present invention;

FIG. 4 is an example of the table of the PCI tree status information of the physical host 1 in the first embodiment of the present invention;

FIG. 6 is an example of the table of the PCI tree status information of the physical host 2 in the first embodiment of the present invention;

FIG. 7 is an example of the table of the PCI status information of a virtual server VM1 of the physical host 2 in the first embodiment of the present invention;

FIG. 9 is an example of the table of the PCI tree management information in the first embodiment of the present invention;

FIG. 10 is an example of the table of the PCI tree configuration information of the physical host 1 in the first embodiment of the present invention;

DETAILED DESCRIPTION OF THE PREFERRED EMBODIMENTS

Figure 1:
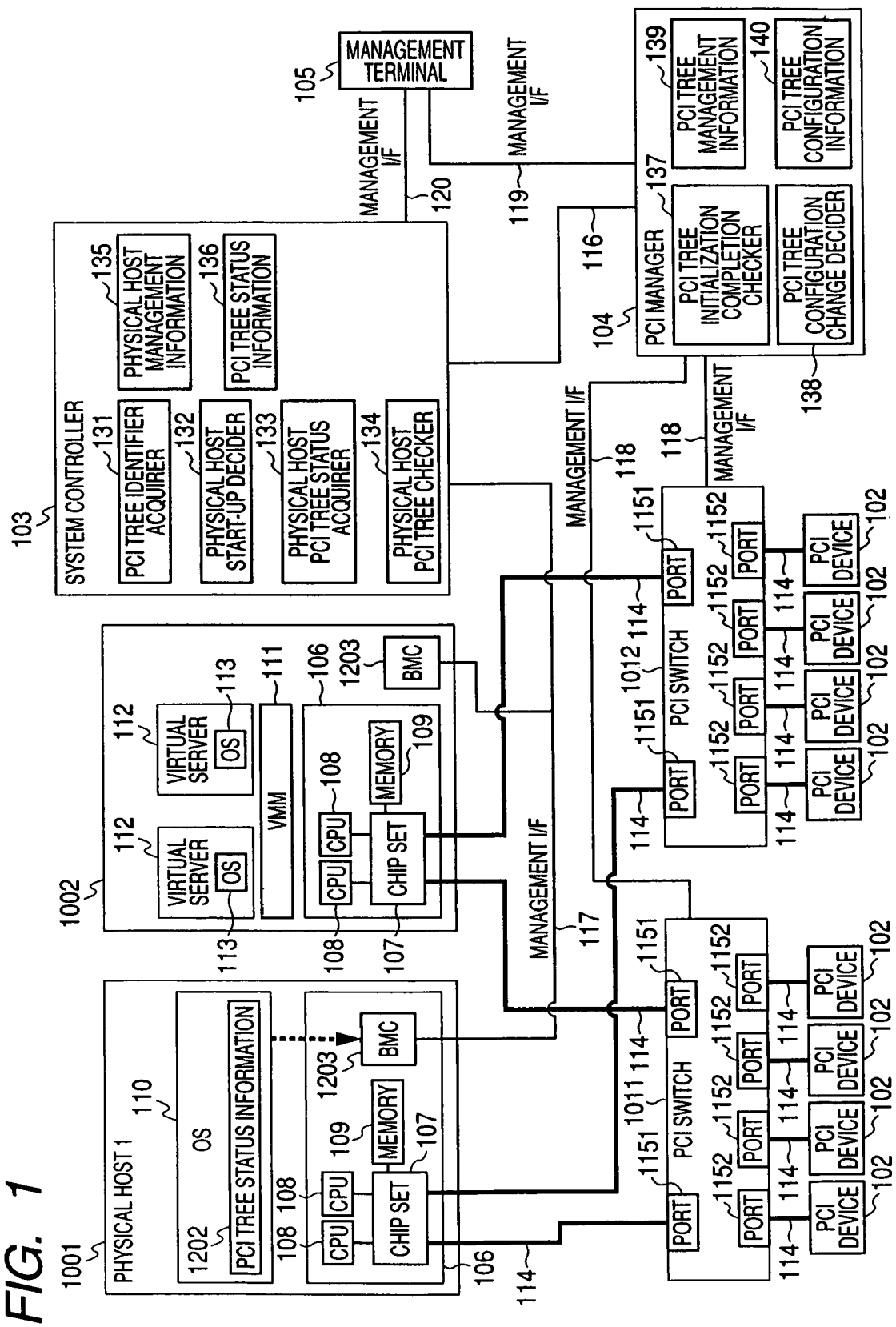
FIG. 1 is a block diagram of a composite type computer system in a first embodiment of the present invention.

Hereunder, there will be described the preferred embodiments of the present invention in detail with reference to the accompanying drawings. In all those drawings, same reference numerals will be used for same devices and units, avoiding redundant description.

First Embodiment

At first, there will be described a configuration of a composite type computer system in a first embodiment of the present invention. FIG. 1 is a block diagram of the composite type computer system in the first embodiment of the present invention. As shown in FIG. 1, the composite type computer system includes one or more physical hosts 1001 and 1002 that are computers; one or more multi-route PCI switches 1011 and 1012 capable of changing the status of the connection between each I/O device and each physical host 100; one or more PCI devices 102; a system controller (system control computer) 103 that controls the power supply of the composite type computer system and manages the status thereof; a PCI manager (PCI management computer) 104 that manages allocation of each PCI device 102 to each physical host 100; and a management terminal 105 that enables the user/system manager to control the composite type computer system. In FIG. 1, the configuration includes two physical hosts 1001 and 1002 and two PCI switches 1011 and 1012 and the two physical hosts 1001 and 1002 are identified as physical hosts 1 and 2 and the two PCI switches 1011 and 1012 are identified as PCI switches 1 and 2 respectively. In FIG. 1, only one system controller 103 and only one PCI manager 104 are shown, but they can be two or more so as to improve the system reliability.

Each of the physical hosts 1001 and 1002 consists of a hardware component 106 that includes one or more CPU (processor) 108; one or more memories 109; one or more chip sets 107; and a management controller BMC (Baseboard Management Controller) 1203. In each physical host 1001/1002 runs an operating system OS 110 that is a software component. If the virtual server technique is employed for the composite type computer system, plural virtual servers 112 come to be included in a virtual machine monitor (hereunder, to be described as the VMM) 111 and a guest OS 113 runs in each virtual server 112. A PCI Express 114, which is a variation of the PCI, is used for the connection between each physical host 1001/1002 and each multi-route PCI switch 1011/1012 and between each multi-route PCI switch 1011/1012 and each PCI device 102.

A control interface 117/118/116 is used for the connection between each physical host 1001/1002 and the system controller 103, between each multi-route PCI switch 1011/1012 and the PCI manager, and between the system controller and the PCI manager. The control interface can be any of a LAN (Local Area Network) and an I²C (Inter-Integrated Circuit). The BMC 1203 collects the configuration and power supply of each physical host and notifies the information to the system controller 103.

The multi-route PCI switch 1011/1012 includes a port 1151 to which the physical hosts 1001 and 1002 are connected and another port 1152 to which PC devices 102 are connected. Each multi-route PCI switch 1011/1012 includes a register (not shown) used to set the connection status of each port 1151/1152.

The management interface 120/119 is used for the connection between the system controller 103 and the management terminal 105 and between the PCI manager 104 and the management terminal 105. The management interface can be any of a LAN and an RS-232C.

In this embodiment, the following components are employed to prevent inconsistency between procedures of PCI tree initialization and physical host powering and inconsistency between PCI tree configuration changes and physical host power statuses.

The system controller 103 holds the power statuses of the physical hosts 1001 and 1002 and those of the virtual servers 112; the physical host management information 135 used to manage the identifiers of the PCI trees allocated to the physical hosts 1001 and 1002 or to virtual servers 112; and the PCI tree status information holding the each PCI tree status recognized by the OS 110 and the VMM 111.

The PCI manager 104 holds the PCI tree management information 139 denoting the statuses of PCI trees allocated to the physical hosts 1001 and 1002, as well as the PCI tree configuration information 140 denoting the correspondence between the topologies of the PCI-to-PCI bridges and the PCI devices 102 in the multi-route PCI switches 1011 and 1012 managed by the PCI manager and the PCI trees allocated to the physical hosts 1001 and 1002.

The system controller 103 includes at least a PCI tree identifier acquirer 131, a physical host start-up decider 132, a physical host PCI tree status acquirer 133, and a physical host PCI tree checker 134. The PCI tree identifier acquirer 131 acquires the identifier and initialization status of each PCI tree allocated to each of the physical hosts 1001 and 1002 from the PCI manager.

The physical host start-up decider 132 monitors each PCI tree allocated to each of the physical hosts 1001 and 1002 and decides upon completion of the initialization of every PCI tree that the physical hosts 1001/1002 can be powered. In other cases, the physical host start-up decider 132 decides the status as powering disabled.

The physical host PCI tree status acquirer 133 acquires the information of each PCI tree recognized by the OS 110 or VMM 111 in the physical hosts, that is, acquires the PCI tree status information 136.

The physical host PCI tree checker 134 acquires PCI tree configuration information from the PCI manager 104.

The PCI manager 104 includes at least a PCI tree initialization completion checker 137 and a PCI tree configuration change decider 138.

The PCI tree initialization completion checker 137 monitors the multi-route PCI switches 1011 and 1012 to check whether or not the connection status between the ports 1151 and 1152 is updated. If it is updated, the checker 137 decides the status as "initialized" and updates the PCI tree management information 139 in accordance with the status. Concretely, the checker 137 monitors the multi-route PCI switches 1011 and 1012 by polling the status of the register in each multi-route PCI switch 1011/1012 to acquire the status information. If the value in the register is updated, the checker 137 updates the PCI tree management information 139 in accordance with the updated result.

The PCI tree configuration change decider 138 acquires the power supply status of each physical host 1001/1002 to which PCI trees are allocated, as well as the system software type and the PCI tree status information 136 from the system controller 103.

Next, there will be described in detail the information held in the composite type computer system with reference to FIGS. 2 through 10.

Figure 3:
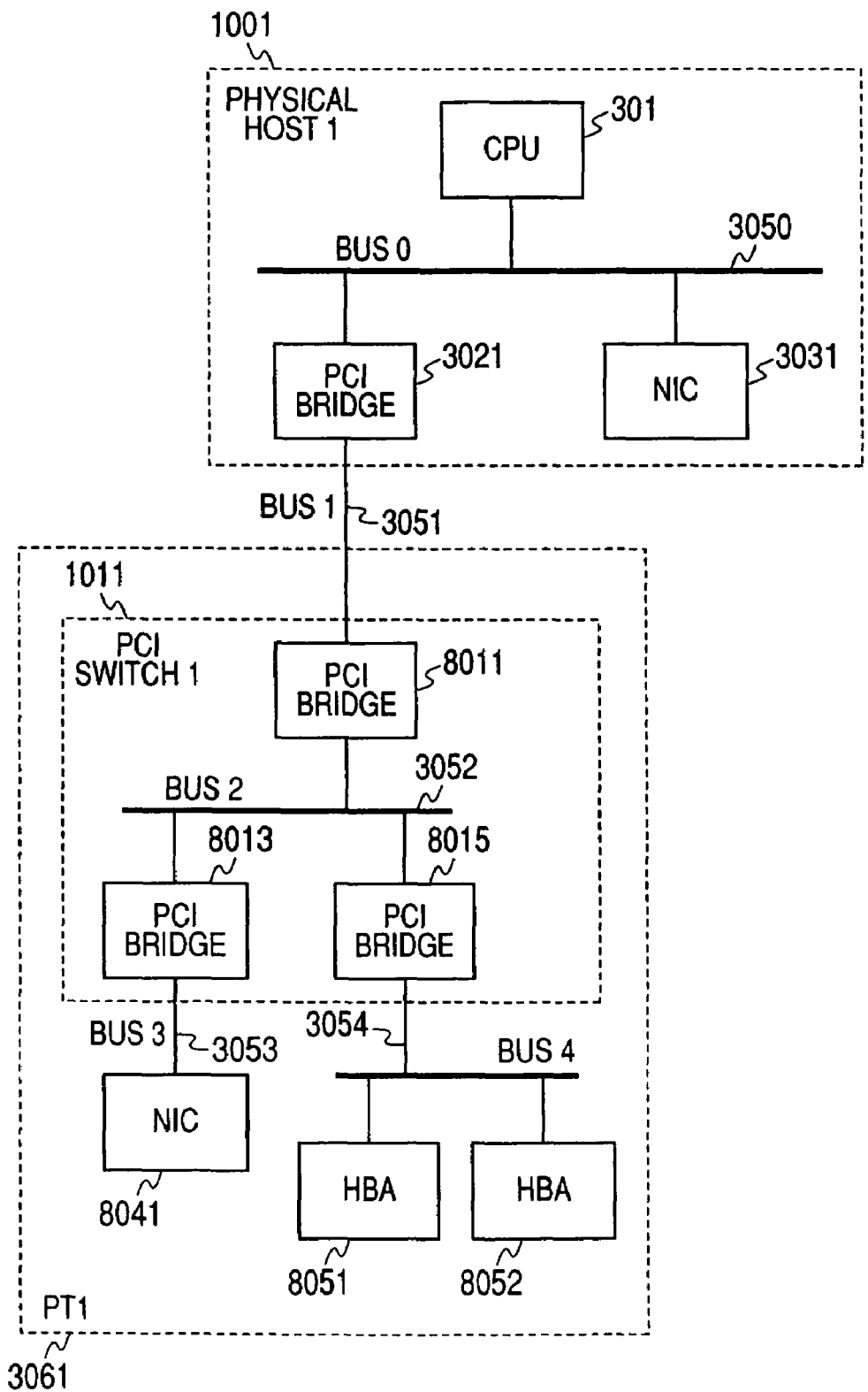
FIG. 3 is a block diagram of a PCI tree of a physical host 1 of the composite type computer system in the first embodiment of the present invention.
Figure 5:
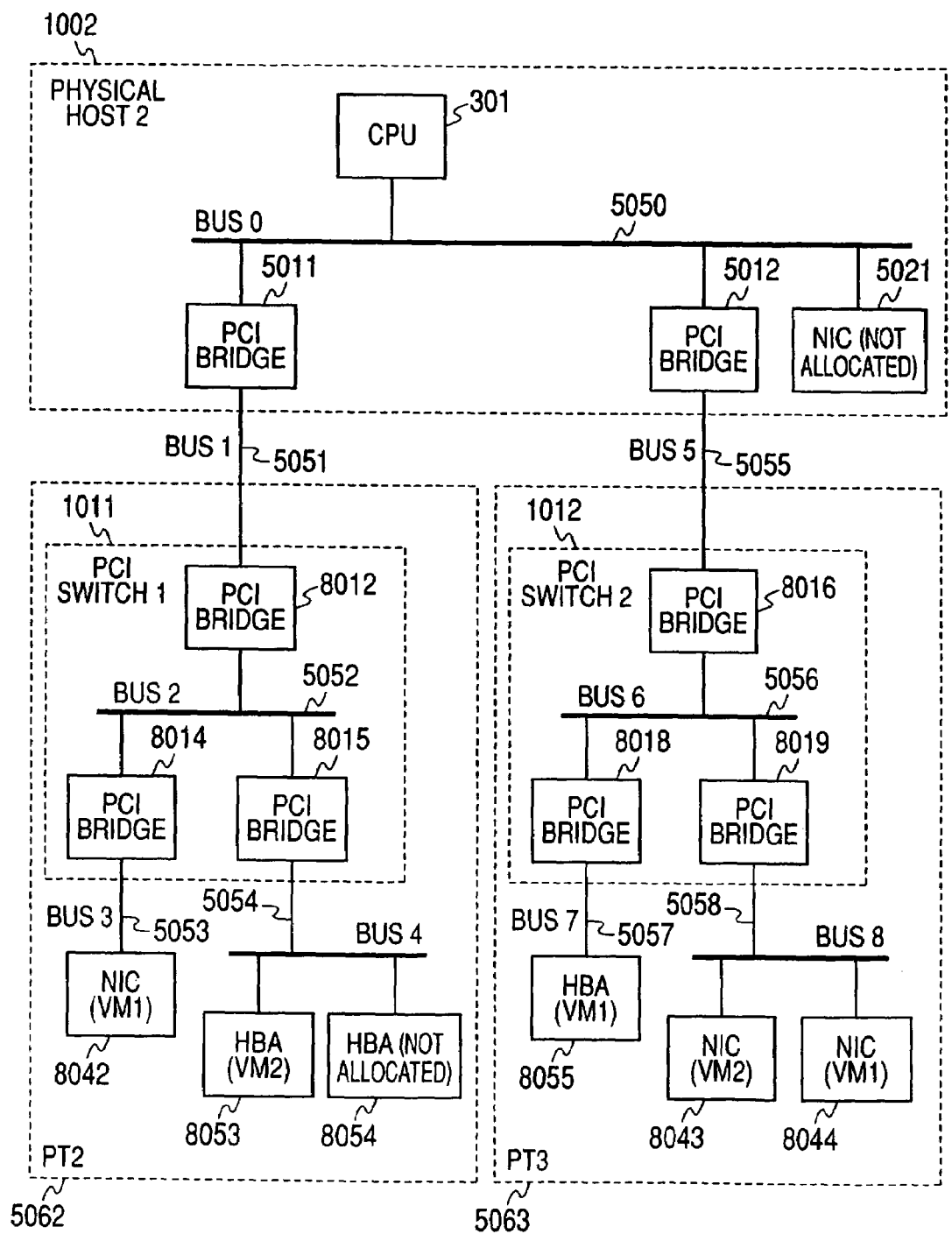
FIG. 5 is a block diagram of a PCI tree of a physical host 2 in the first embodiment of the present invention.
Figure 8:
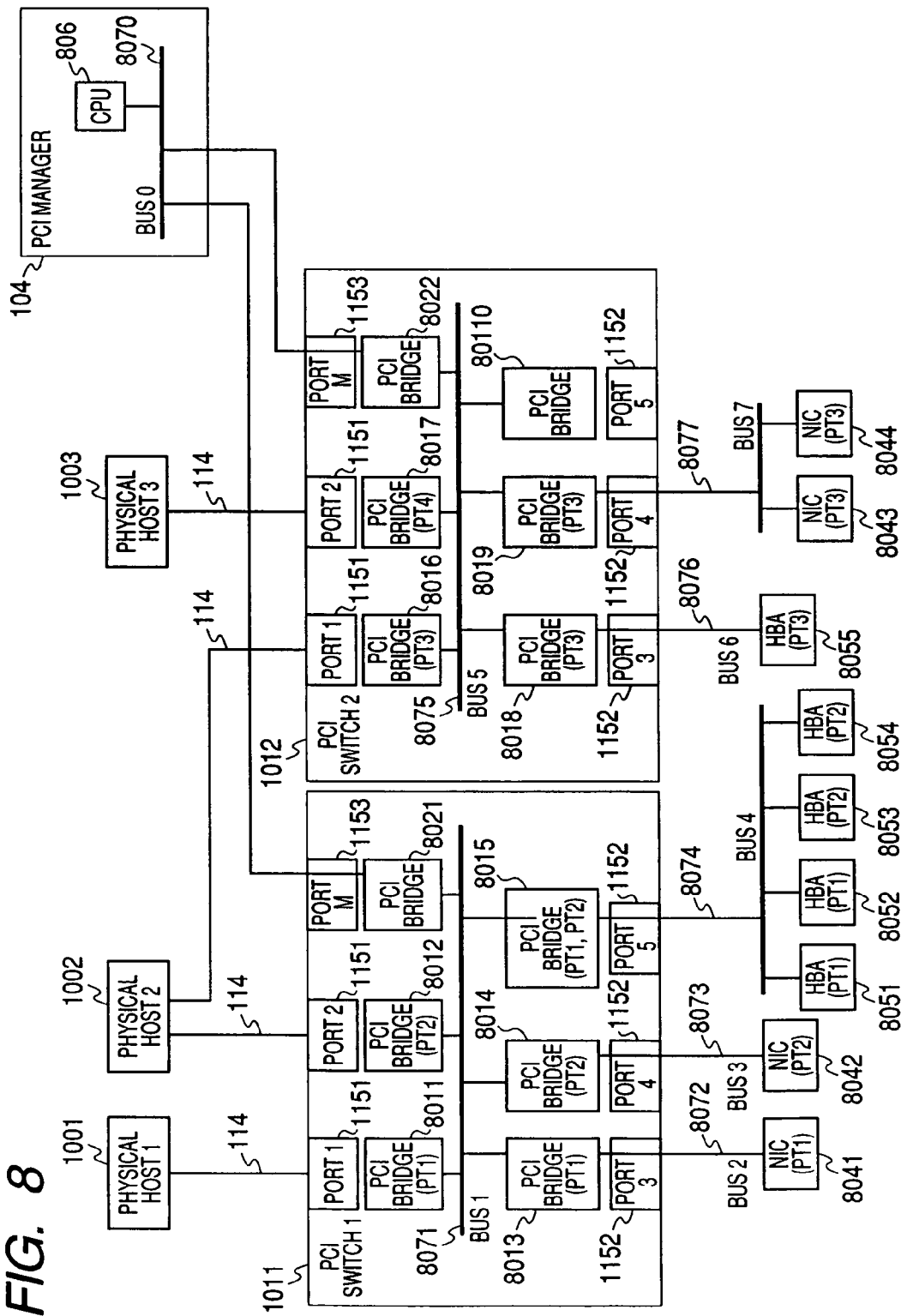
FIG. 8 is a block diagram of a PCI tree managed by a PCI manager in the first embodiment of the present invention.

FIG. 2 shows an example of the table of the physical host management information 135 held by the composite type computer system in this first embodiment. FIG. 3 shows a block diagram of a PCI tree of the physical host 1 of the physical hosts of the composite type computer system in this first embodiment. FIG. 4 is an example of the table of the PCI tree status information 136 of the physical host 1 of the composite type computer system in this first embodiment. FIG. 5 is a block diagram of a PCI tree of the physical host 2 of the composite type computer system in this first embodiment. FIG. 6 is an example of the table of the PCI tree status information 136 of the physical host 2 of the composite type computer system in this first embodiment. FIG. 7 is an example of the table of the PCI tree status information 136 of a virtual server 1 of the physical host 2 of the composite type computer system in this first embodiment. FIG. 8 is an example of the PCI tree managed by the PCI manager 104 of the composite type computer system in this first embodiment. FIG. 9 is an example of the table of the PCI tree management information 139 of the composite type computer system in this first embodiment. FIG. 10 is an example of the table of the PCI tree configuration information 140 of the physical host 1 of the composite type computer system in this first embodiment.

The physical host management information 135 held by the system controller 103 can be tabulated as shown with FT2 in FIG. 2. The table includes at least columns of physical host identifier K201 that identifies the physical host 1 or 2 as a representative of the physical hosts 1001 and 1002 in the composite type computer system; virtual server identifier K202 that identifies a virtual server 112 in a physical host; PCI tree identifier K203 that denotes a PCI tree allocated to a physical host; power status K204 that denotes the power status of a physical host or virtual server; OS/VMM type K205 that denotes the type of the OS 110 or VMM 111 running in an object physical host or the type of an OS running in a virtual server 112; and PCI tree status information K206 that denotes "enable" or "disable" for the PCI tree status information 136 as the status of a PCI tree recognized by the OS 110 or VMM 111.

In K204, for example, is set any of "Initializing" denoting that the initialization is being carried out, "Standby" denoting that the power can be supplied any time, and "Active" denoting that the power is already supplied. In the example shown in FIG. 2, the physical host identifier K201 is "1" in the row G201, so the VMM is not running in the physical host 1. Thus "Not Available (NA)" is set in the virtual server identifier K202, "PT1" is set in the identifier K203 of the PCI tree allocated to the physical host 1, "Standby" set in the power supply status K204, "OSx" set in the OS/VMM type K205, and "Enable" is set in the PCI tree status information K206 respectively. As for the physical host 2 having the identifier "2" set in the physical host identifier K201 in the rows G202 to G205, the VMM 111 is running in the physical host 2, which has active three virtual servers VM1, VM2, and VM3 as shown in the column of the virtual server identifier K202.

For the physical host 2 (1002), PCI trees PT2 and PT3 are set in the PCI tree identifier column K203 and allocated to the physical host 2 as shown in the row G202. And because the virtual servers 111 (VM1 to VM3) use the PCI trees PT2 and PT3 allocated to the physical host 2, "NA" is set in other rows G203 to G205 for the virtual servers VM1 to VM3. This means that the PCI trees are allocated to the virtual servers VM1 to VM3 by the VMM 111, thereby "Not Available" is set in the PCI tree identifier column K203 in the table of the physical host management information 135.

For the physical host 2 (1002), the power supply status K204 is "Active", the OS/VMM type K205 is "VMMy", and the PCI tree status information K206 is "Enable". For the virtual server 1 of the physical host 2 in the row G203, the power status K204 is "Active", the OS/VMM type K205 is "OSy", and the PCI tree status information K206 is "Enable".

Next, there will be described the PCI tree status information 136 of the physical host 2 and that of the virtual server 1 (VM1) of the physical host 2.

As shown in FIG. 3, the OS 110 of the physical host 1 recognizes the PCI tree PT1 (3061) allocated from the physical host 1 (1001) and the multi-route PCI switch 1011/1012.

The physical host 1 includes a host bus 301 that includes a CPU and a memory; a PCI-to-PCI bridge 3021, an NIC 3031, and a PCI bus BUS0 (3050). The PCI tree PT1 (3061) includes a multi-route PCI switch (1011), PCI-to-PCI bridges 8011, 8013, and 8015, an NIC 8041, HBAs 8051 and 8052, a PCI buses BUS2 (3052), BUS3 (3052), and BUS4 (3054). The physical host 1 and the PCI tree PT1 (3061) are connected to each other through the PCI bus BUS1 (3051).

Consequently, the PCI tree status information 136 of the physical host 1 is tabulated as shown with FT4 in FIG. 4. The table includes at least columns of Bus Number (Bus#) K401 that identifies a place of a PCI device 102 in a PCI tree; Device Number (Dev#) K402, Function Number (Func#) K403, and Device Type K404 that denotes a PCI device type; and PCI Tree Identifier K405 that denotes a PCI tree to which the subject device belongs.

For example, as for the (Bus#, Dev#, Func#)=(0, 1, 0), the device type K404 is a PCI bridge 3021 and it does not belong to the PCI tree PT1 as shown in FIG. 3. Thus the PCI tree identifier K405 is "NA". Similarly, as for (Bus#, Dev#, Func#)=(0, 2, 0), the device type K404 is a network controller 3031 and it does not belong to the PCI tree PT1 as shown in FIG. 3. Thus the PCI tree identifier K405 is "NA".

And as shown in FIG. 5, the VMM 111 of the physical host 2 recognizes the PCI tree PT2 (5056) allocated from the physical host 2 and the multi-route PCI switch 1 (1011) and the PCI tree PT3 (5063) allocated from the multi-route PCI switch 2 (1012) respectively.

The physical host 2 (1002) includes a host bus 301 that includes a CPU and a memory; PCI-to-PCI bridges 5011 and 5012; an NIC 5021, and a PCI bus BUS0 (5050). The PCI tree PT2 (5062) includes a multi-route PCI switch 1 (1011), PCI-to-PCI bridges 8012, 8014, and 8015, an NIC 8042, HBAs 8053 and 8054, PCI buses BUS2 (5052), BUS3 (3053), and BUS4 (5054).

The PCI tree PT3 (5063) includes a multi-route PCI switch 2 (1012), PCI-to-PCI bridges 8016, 8018, and 8091, NICs 8043 and 8044, an HBA 8055, PCI buses BUS6 (5056), BUS7 (5057), and BUS8 (5058).

The physical host 2 (1002) and the PCI tree PT2 (3062) are connected to each other through the PCI bus BUS1 (5051) and the physical host 2 (1002) and the PCI tree PY3 (5063) are connected to each other through the PCI bus BUS5 (5055).

If plural virtual servers 112 are included in the VMM 111 just like in the physical host 2 (1002), the PCI tree status information 136 can be tabulated as shown with FT6 in FIG. 6. The table includes at least the columns shown with the FT6 of FIG. 6, as well as a column of VM allocation K606 that denotes allocation of a PCI device to a virtual server. For example, as for (Bus#, Dev#, and Func#)=(0, 1, 0) shown in FIG. 6, the device type K404 is "PCI-to-PCI bridge 5011, and it does not belong to any of the PCI trees PT2 and PT3 as shown in FIG. 5, the PCI tree identifier K405 is thus "NA (Not Available)". In this example, the PCI-to-PCI bridge is not allocated to any specific virtual servers, so the VM allocation K606 is "NA".

As for the row of (Bus#, Dev#, and Func#)=(3, 1, 0), the device type K404 is a network controller 8042 and as shown in FIG. 5, the PCI tree identifier K405 is PT2 and the VM allocation K606 is VM1. As shown in the example of FIG. 5, plural PCI trees can be allocated to one physical host.

The PCI tree status information 136 of the virtual server VM1 of the physical host 2 is as shown with FT7 of FIG. 7 just like in the physical host 1 shown in FIG. 6.

Next, there will be described the PCI tree management information 139. The PCI trees of the multi-route PCI switch 1011 and 1012 recognized by the PCI manager 104 are configured, for example, as shown in FIG. 8 respectively. In the example shown in FIG. 8, a physical host 3 (1003) is added to the configuration shown in FIG. 1 and the PCI manager 104 includes a host bus 806 that includes a CPU and a BUS0 (8070). Each of the multi-route PCI switches 1011 and 1012 is connected to the BUS0 (8070) of the PCI manager 104 through the management port 1153. The PCI manager 104 holds the PCI trees of the PCI buses BUS0 to BUS7 (8070 to 8077).

The physical host 1 (1001) is connected to the port 1 of the multi-route PCI switch 1 (1011), the physical host 2 is connected to the port 2 of the multi-route PCI switch 1 (1011), and the physical host 3 is connected to the port 2 of the multi-route PCI switch 2 (1012) respectively.

The multi-route PCI switch 1 (1011) includes PCI-to-PCI bridges 8011, 8012, 8013, 8014, 8015, and 8021. And NICs 8041 and 8042, as well as HBAs 8051, 8052, 8053, and 8054 are connected to the port 1152. The multi-route PCI switch 2 (1012) includes PCI-to-PCI bridges 8016 to 80110 and 8022. The NICs 8043 and 8044, as well as the HBA 8055 are connected to the port 1152.

In case of the configuration shown in FIG. 8, the PCI tree management information 139 is tabulated as shown with FT9 in FIG. 9 and the table includes at least columns of switch number K901 that identifies the multi-route PCI switch 1011 or 1012; port number K902 of a multi-route PCI switch connected to the physical hosts 1001 and 1002; PCI tree identifier K903 that identifies the top PCI tree having the port number K902 in the tree structure; and PCI tree initialization status K904 that denotes the status of the allocation of a PCI tree to a physical host.

In case of the PCI tree initialization status K904, there are statuses "Not Initialized" denoting that the PCI tree setting is not completed, "Initializing" denoting that the setting is being made, and "Initialized" denoting that the setting is already completed.

Next, there will be described the PCI tree configuration information 140. The PCI tree configuration information 140 is assumed as master information denoting a relationship of allocation between physical host 1001/1002 and each PCI device 102. This configuration information is often set by the user and system manager through the management terminal 105.

In case of the configuration shown in FIG. 8, the PCI tree configuration information 140 is tabulated as shown with FT10 in FIG. 10. The table includes at least columns of Bus# K1001 that stores bus numbers for identifying places of PCI devices 102 in each PCI tree; Dev# K1002 that stores device identifiers; Func# K1003 that stores identifiers denoting device functions; device type K1004 denoting PCI device types; Identifier K1005 of PCI trees to which PCI devices belong; switch number K1006 that stores identifiers of multi-route PCI switches 1011 and 1012 to which PCI devices belong; and port number K1007 denoting the port numbers of switches related to the bridges if the subject PCI device is a PCI-to-PCI bridge in the multi-route PCI switch.

Next, there will be described how to control the composite type computer system in the first embodiment of the present invention. At first, there will be described how to control the powering to the physical host 1011 or 1012 of the composite type computer system.

Figure 11:
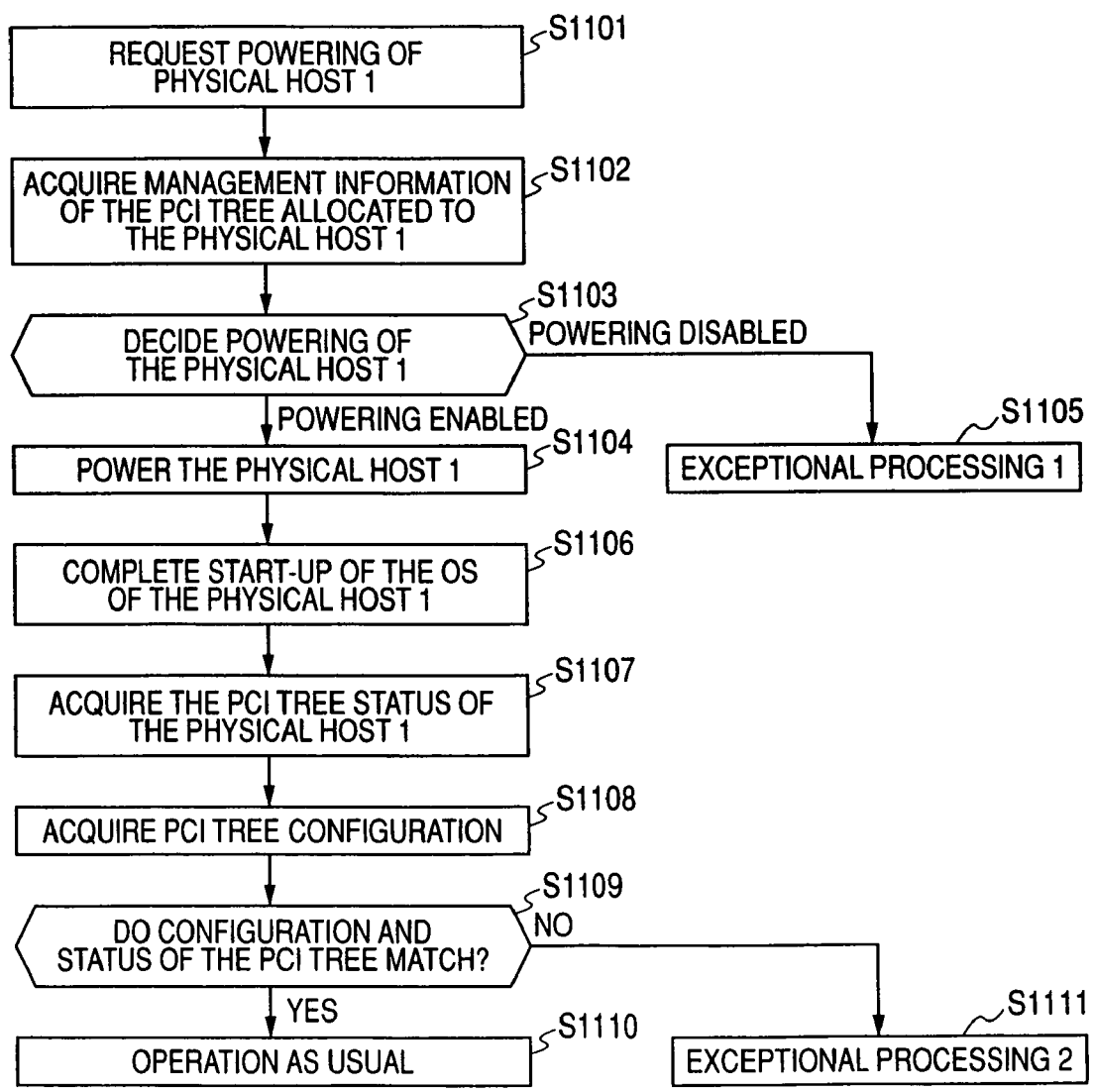
FIG. 11 is a flowchart of the processings for powering the physical host 1 (in the non-virtual server environment) in the first embodiment of the present invention.

FIG. 11 is a flowchart of how to control the powering to the physical host 1 (in the non-virtual server environment) of the composite type computer system in the first embodiment of the present invention. The physical host 1001/1002 is powered at a timing of, for example, a request issued by the user or system manager to the system controller 103 so as to power the physical host 1 (1001) through the management terminal 105 (step S1101). The system controller 103 acquires the identifier of the PCI tree allocated to the physical host 1 (1001) from the PCI manager 104 and the initialization status of the PCI tree through the PCI tree identifier acquirer 131 (step S1102).

Here, the system controller 103 issues an acquirement request to the PCI manager 104 using the switch number and the port number of the multi-route PCI switch 1011/1012 to which the physical host 1 (1001) is connected. Thus the PCI manager 104 can select the PCI tree identifier K903 according to the PCI tree management information 139 shown in FIG. 9. The PCI manager 104 can also acquire the PCI tree initialization status, for example, by polling a register (not shown) of the multi-route PCI switch 1011/1012 through the PCI tree initialization completion checker 137. If the status is updated, the PCI manager 104 updates the PCI tree management information 139 according to the updated result.

After this, if all the PCI trees allocated to the physical host 1 (1001) from the physical host start-up decider 132 are already initialized, the system controller 103 decides that the physical host 1 can be powered. In other cases, the physical host 1 decides that the physical host 1 cannot be powered (step S1103).

In the example shown in FIG. 9, because the initialization status of the PCI tree PT1 allocated to the physical host 1 is "Initialized", the system controller 103 decides that the physical host 1 can be powered. If decided that the physical host 1 cannot be powered in this step S1103, the system controller 103 carries out an exceptional processing, for example, retries the powering from the beginning. Otherwise, the system controller 103 notifies the fact to the management terminal 105 as an error and, for example, cancels the powering (step S1105).

On the other hand, if the system controller 103 decides that the physical host 1 cannot be powered, the system controller 103 powers the physical host 1 (1001) through the control interface 117 (step S1104). And when the physical host 1 (1001) is powered, the system controller 103 enables the OS 110 of the physical host 1 to use each PCI device 102 belonging to the PCI tree. Then, the OS 110 starts up.

The system controller 103 then detects that the OS 110 has started up in the physical host 100 through the control interface 117 (step S1106).

After this, the system controller 103 acquires the information of the PCI tree recognized by the OS 110, that is, the PCI tree status information 136 from the physical host 1 (1001) through the physical host PCI tree status acquirer 133 (step S1107). Then, in step S1008, the processings in steps S1101 to 1107 are carried out as shown in FIG. 12.

Figure 12:
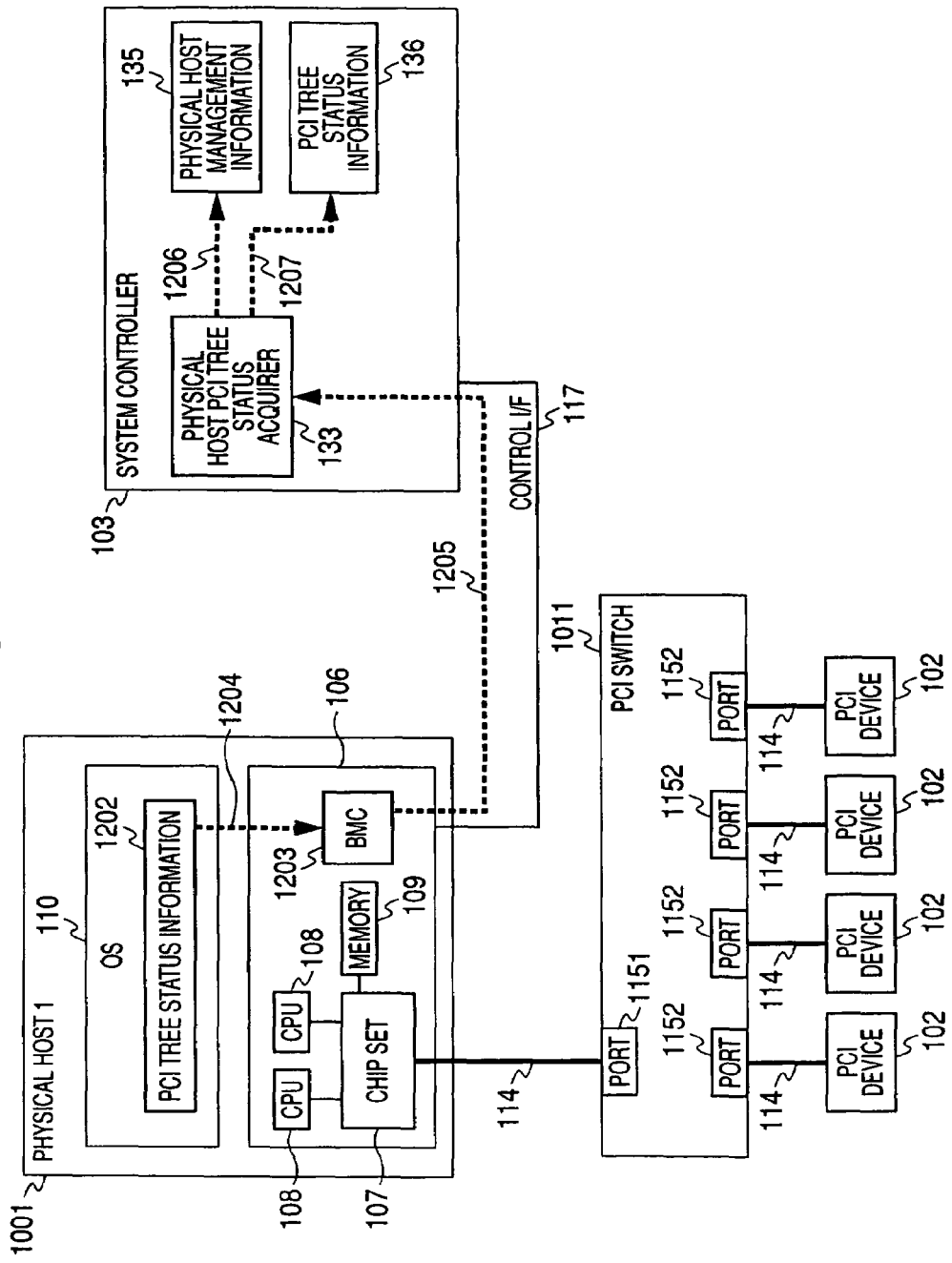
FIG. 12 is a block diagram for describing the procedures of a physical host PCI tree status information acquirer to acquire the PCI tree status information in the first embodiment of the present invention.

FIG. 12 is a block diagram showing procedures for how the physical host PCI tree status acquirer 133 of the system controller acquires the PCI tree status information 136 in the first embodiment. In this embodiment, as shown in FIG. 12, the OS 110 holds the PCI tree status information 1202 that is the information of the PCI tree recognized by the OS 110 itself so as to use the PCI devices 102.

The OS 110, for example, upon receiving a PCI tree status acquirement request from the system controller 103, notifies the PCI tree status information to the system controller 103 through the BMC 1203 that is the management controller of the physical host 1 (1101) (routes 1204 and 1205).

After this, the physical host PCI tree status acquirer 133 stores the PCI tree status information 136 (route 1207) and sets "Enable" for the status information 136 in the column of the PCI tree status information K206 in the table of the physical host management information 135 shown in FIG. 2 (route 1206). In the physical host 2, the OS 110 is replaced with the OS 113 that runs in the virtual server 112 configured in the VMM 111. It is also possible here to use such a system firmware program as the BIOS (Basic Input/Output System), EFI (Extensible Firmware Interface), or the like to carry out the above processings instead of the OS 110.

Then, the system controller 103 acquires the PCI tree configuration information 140 from the PCI manager 104 through the physical host PCI tree checker 134 (step S1108) and makes a comparison between the PCI tree status information 136 and the PCI tree configuration information 140 to check the matching between both information items (step S1109). Consequently, the system controller 103 can check the matching between the allocation of the PCI device to the physical host 1001/1002 set by the user or system manager and the actual allocation of the PCI device 102 recognized by the system software programs such as the OS 110, etc. In other words, the system controller can check whether or not the configuration information is updated with those user/system manager's settings correctly. In this step S1109, if the configuration information matches with the actual status, the physical host 1 (1001) gets ready to carry out usual processings (step S1110). If not match, the system controller carries out an exceptional processing, for example, restarts the physical host 1 (1001) or notifies the error to the management terminal 105, then shuts down the physical host 1 (step S1111).

Figure 13:
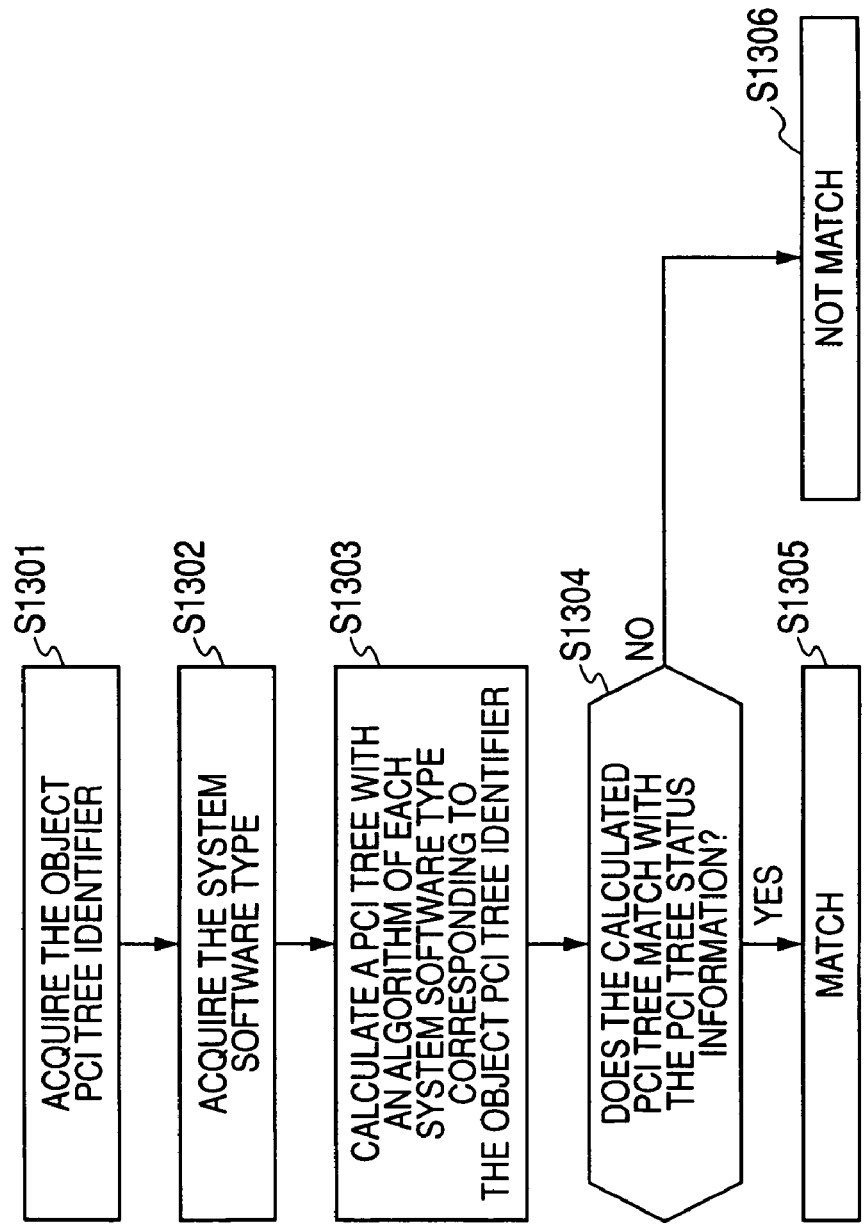
FIG. 13 is a flowchart of the processings for comparing the PCI tree status information 136 with the PCI tree configuration information 140 in the first embodiment of the present invention.
Figure 14:
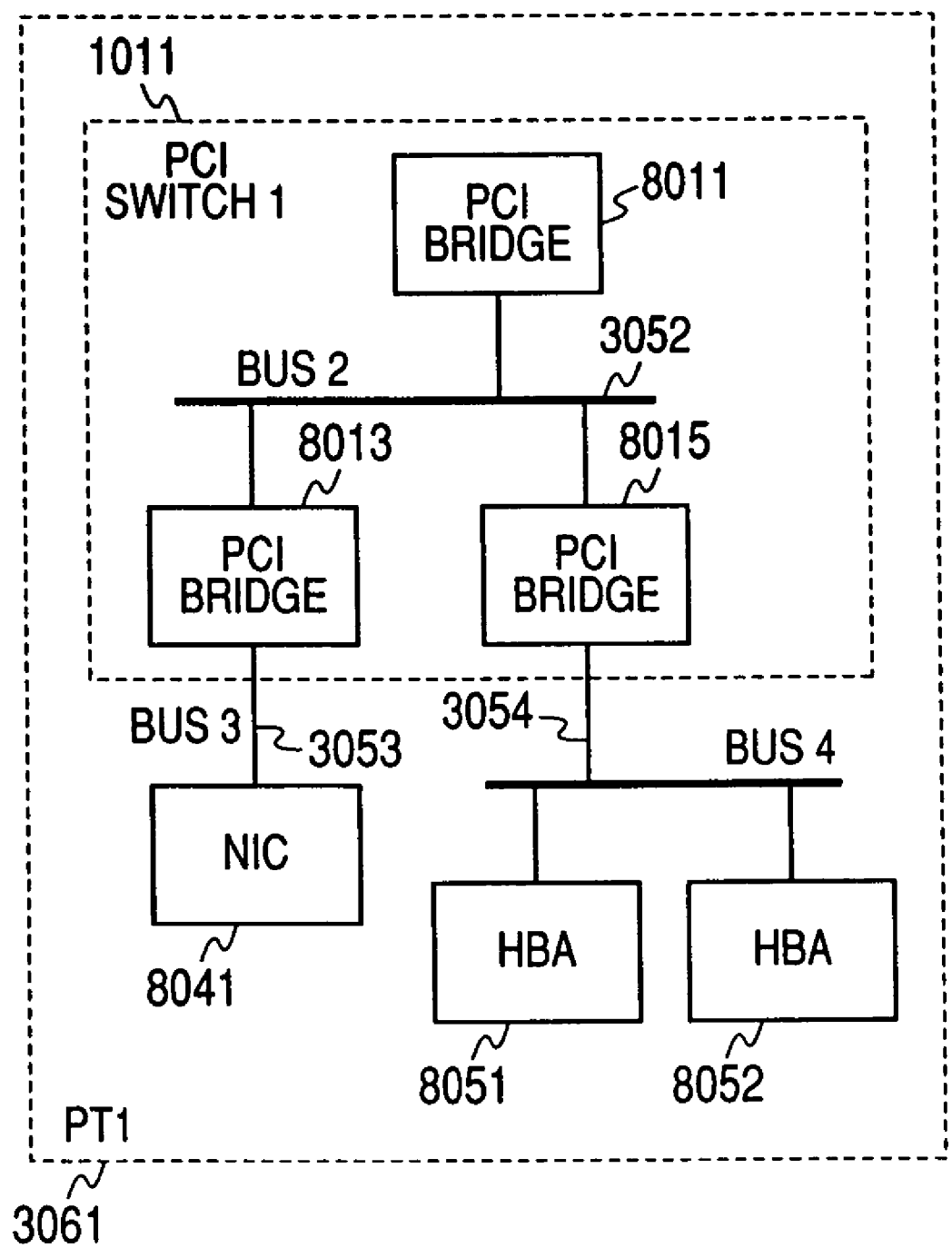
FIG. 14 is a block diagram of a PCI tree recognized by a system software program in the first embodiment of the present invention.
Figure 15:
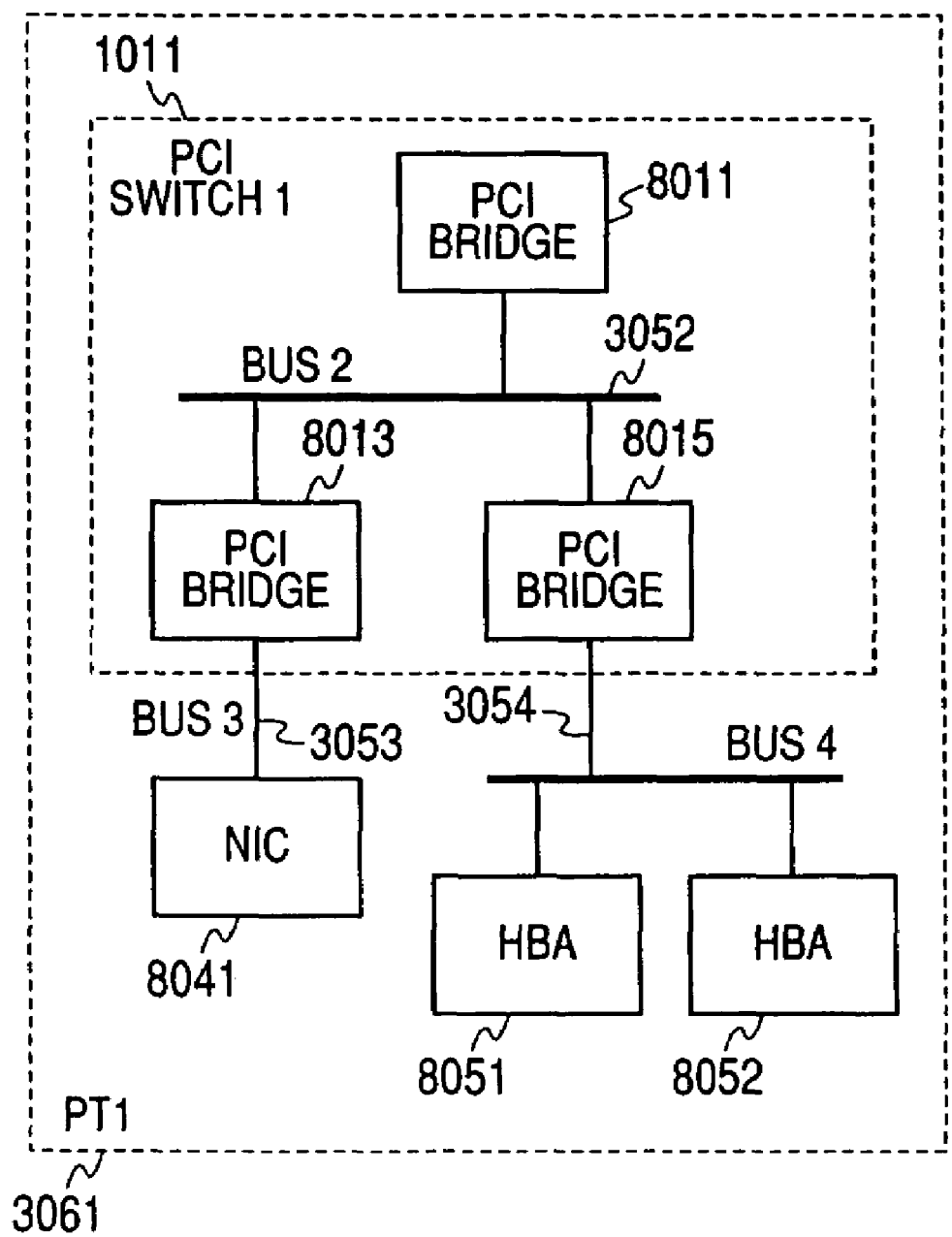
FIG. 15 is a block diagram of a PCI tree recognized by another system software program in the first embodiment of the present invention.

Next, there will be described in detail the processings of comparison between the PCI tree status information 136 and the PCI tree configuration information 140 in step S1109 in this embodiment with reference to FIGS. 13 through 15. FIG. 13 is a flowchart for describing such a comparison between the PCI tree status information 136 and the PCI tree configuration information 140 in the composite type computer system in this first embodiment. FIG. 14 is a block diagram of an example of the PCI tree recognized by the system software (OS 110 or VMM 111) of the composite type computer system in this first embodiment. FIG. 15 is a block diagram of an example of the PCI tree recognized by the system software of the composite type computer system in this first embodiment.

As shown in FIG. 13, the physical host PCI tree checker 114 of the system controller 103 acquires the identifier PT1 of the PCI tree allocated to the physical host 1001/1002 from the physical host management information 135 (step S1301). Then, the physical host PCI tree checker 114 acquires the "OSx" from the table of the physical host management information 135 (step S1302). The OSx" set in the OS/VMM type k205 shown in FIG. 2 denotes the type of the system software that runs in the physical host 1001/1002. The PCI tree "Bus Number" is specified with a specific method when the system software is started up. Thus the PCI tree topology might differ among system software types.

For example, if the system software (OS 110) recognizes the PCI tree PT1 allocated to the physical host 1 (1001), the topology will become the same as that of the PCI buses BUS2 (1412), BUS3 (14013), and BUS4 (14014) as shown in FIG. 14. If another system software recognizes the PCI tree PT1, the topology will become the same as that of the PCI buses BUS2 (1412), BUS3 (14013), and BUS4 (14014) as shown in FIG. 15.

In other words, in the examples shown in FIGS. 14 and 15, the topologies of the BUS3 and BUS4 are exchanged. So, it would be waist of time to make a comparison simply between the PCI tree status information 136 and the PCI tree configuration information 140 to obtain a correct result from the comparison between those topologies. In this embodiment, therefore, the physical host PCI tree checker 114 calculates a PCI tree to be recognized from the OSx in accordance with the PCI tree configuration information 140 and the PCI tree generation algorithm of the OSx, which denotes a system software type (step S1303).

The physical host PCI tree checker 114 of the system controller then makes a comparison between the PCI tree calculated as described above and recognized by the OSx and the PCI tree status information 136 to check the result (step S1304) to decide matching (step S1305) or not matching (step S1306). While the physical host PCI tree checker 114 of the system controller 103 calculates a PCI tree to be recognized by the system software in the above case, the PCI manager 104 can also calculates the PCI tree and notifies only the result to the system controller 103 instead of the checker 114.

In the processings shown in the flowchart of FIG. 11, the operation of a non-virtual server is described. Next, there will be described how to power the physical host 1002 that includes a virtual server 112.

Figure 16:
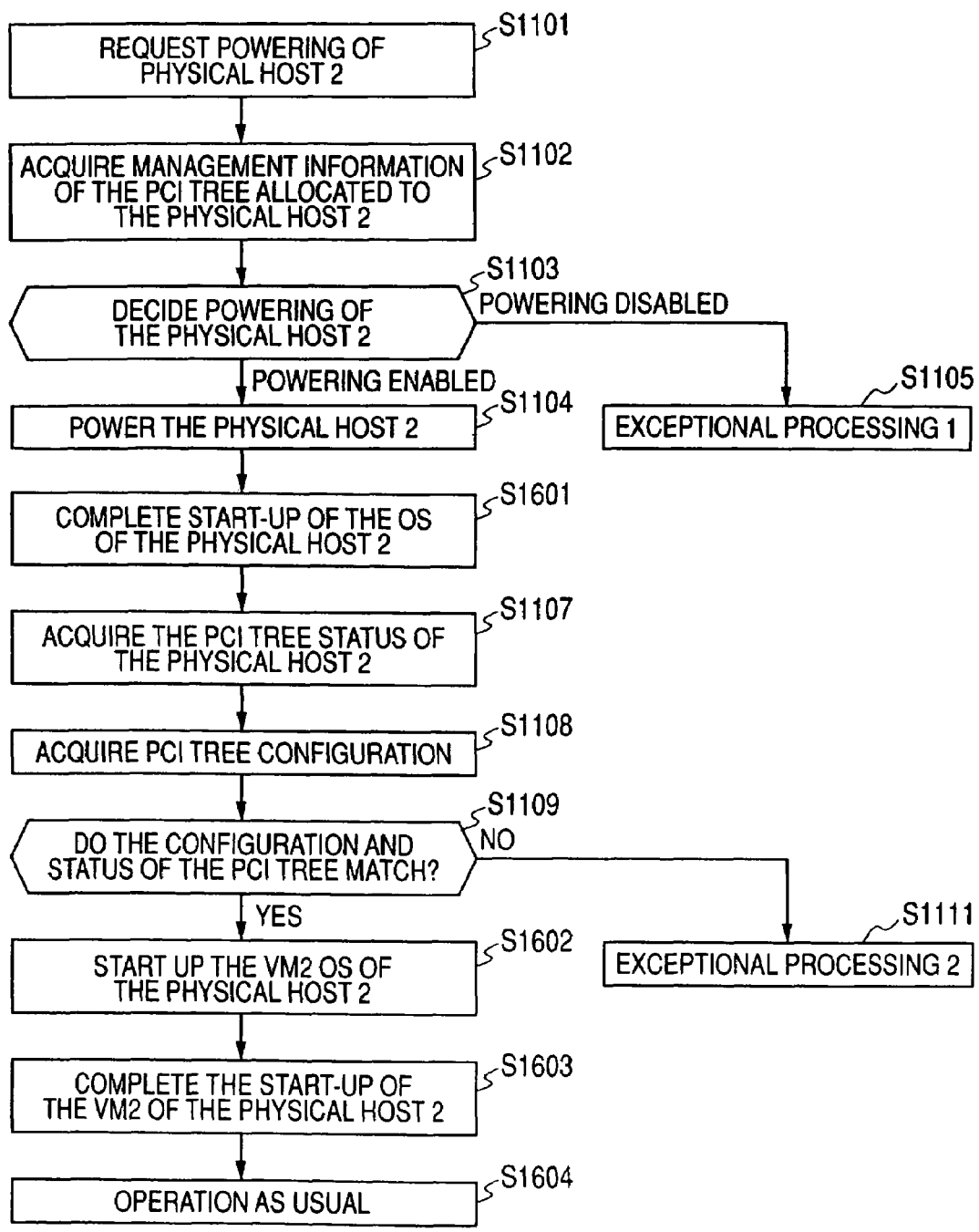
FIG. 16 is a flowchart of the processings to be carried out after powering the physical host 2 (in the vertical server environment) in the first embodiment of the present invention.

FIG. 16 is a flowchart of an example of how to power the physical host 2 (in the virtual server environment) of the composite type computer system in the first embodiment of the present invention.

As shown in FIG. 2, the physical host 2 (1002) includes three virtual servers VM1, VM2, and VM3. The procedures shown in FIG. 16 are the same as those of the steps S1101 to S1105, S1107 to S1109, and S111 shown in FIG. 11 for powering the physical host 1 of the composite type computer system in the first embodiment of the present invention. So, only the difference from FIG. 11 will be described below, avoiding redundant description.

When the virtual server 112 powers the physical host 2 (step S1104), the VMM 111 starts up, so the system controller 103 confirms through the control interface 117 that the VMM 111 has started up (step S1601). If the system controller 103 confirms that the PCI tree status information 136 matches with the PCI tree configuration information 140 as a result of the comparison (step S1109), the system controller 103 starts up the OS 113 of the VM 2 through the control interface 117 (step S1602) and confirms through the control interface 117 that the OS 110 has started up (step S1603). Then, the system controller enables the physical host 2 (1002) to carry out usual processings (step S1604). The composite type computer system in this embodiment can thus control so as to assure the completion of configuring the PCI tree to be allocated to the object computer upon powering the computer. As a result, the computer comes to start up in the correct PCI device configuration. Furthermore, it is also possible at this time to assure the matching between the actual PCI tree recognized by the OS 110 or VMM 111 that is a so-called system software program and the PCI tree set by the user/system manager.

Figure 17:
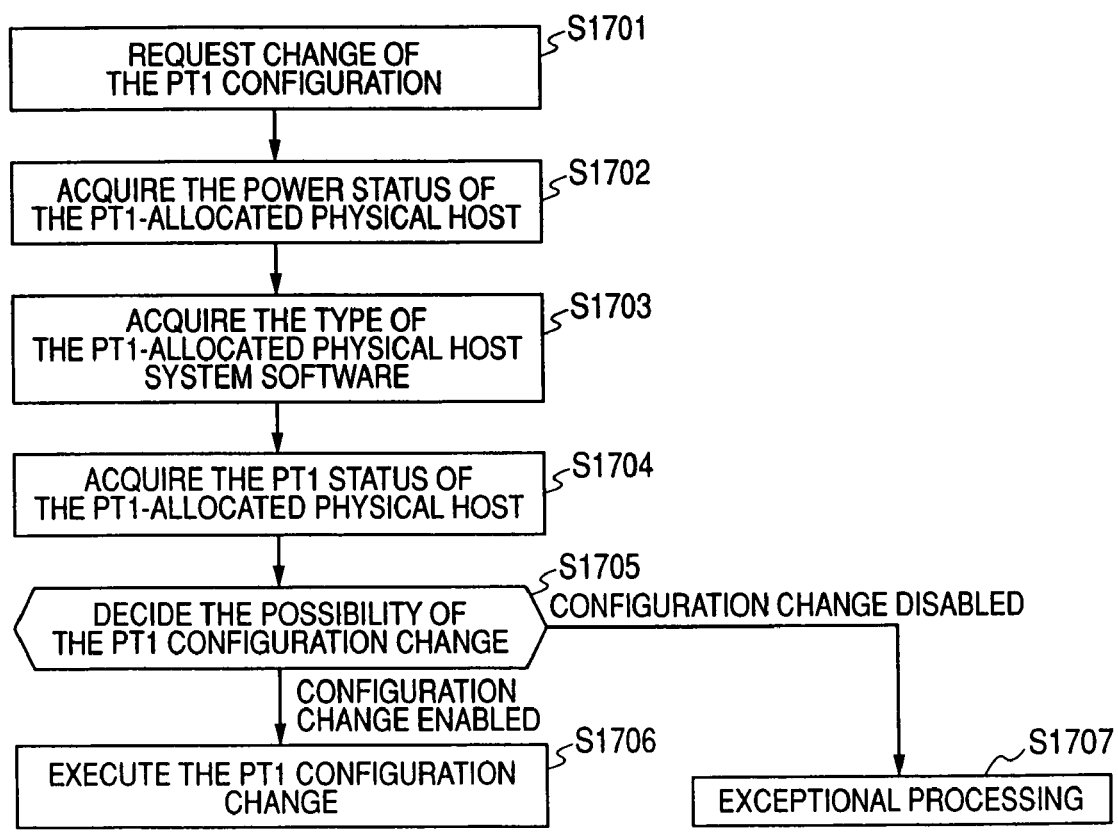
FIG. 17 is a flowchart of the processings for changing the configuration of a PCI tree allocated to the physical host 1 (in the non-virtual server environment) in the first embodiment of the present invention.

Next, there will be described how to change the configuration of a PCI tree allocated to a physical host of the composite type computer system. FIG. 17 is a flowchart of an example of how to change the configuration of a PCI tree allocated to the physical host 1 (in the virtual server environment) of the composite type computer system in the first embodiment of the present invention. The user or system manager can change the configuration of such a PCI tree by issuing a configuration change request to the PCI manager 104 with respect to the PCI tree PT1 of the physical host 1 (1001) through the management terminal 105 (step S1701). Upon receiving the request, the PCI manager 104 acquires the power status of the physical host 1 (1001) to which the PCI tree PT1 is allocated from the system controller 103, as well as the system software type and the PCI tree status information from the system controller 103 through the PCI tree change decider 138 (steps S1702 to S1704).

Then, the PCI manager 104 checks the information related to the physical host 1 (1001) to decide the possibility of the configuration change of the PCI tree PT1. Concretely, this check is made, for example, as follows. When the power supply status of the physical host 1 (1001) is "Active", the configuration change is disabled. When the system software type does not correspond to the hot plug of the object PCI device, the configuration change is disabled. And when the PCI tree status information denotes that the object PCI device type does not correspond to the hot plug, the configuration change is disabled. As a result of this check, if the configuration change is enabled, the PCI manager 104 changes the configuration of the PCI tree PT1 (step S1706). If disabled, the PCI manager 104 carries out an exceptional processing, for example, notifies the error (disabled) to the management terminal 105 and exits the configuration change processing (step S1707).

In case of the processings shown in FIG. 17, the description was made for a case of a non-virtual server. Next, there will be described how to control the configuration change of a PCI tree of the physical host 2 (1002) that includes a virtual server 112.

Figure 18:
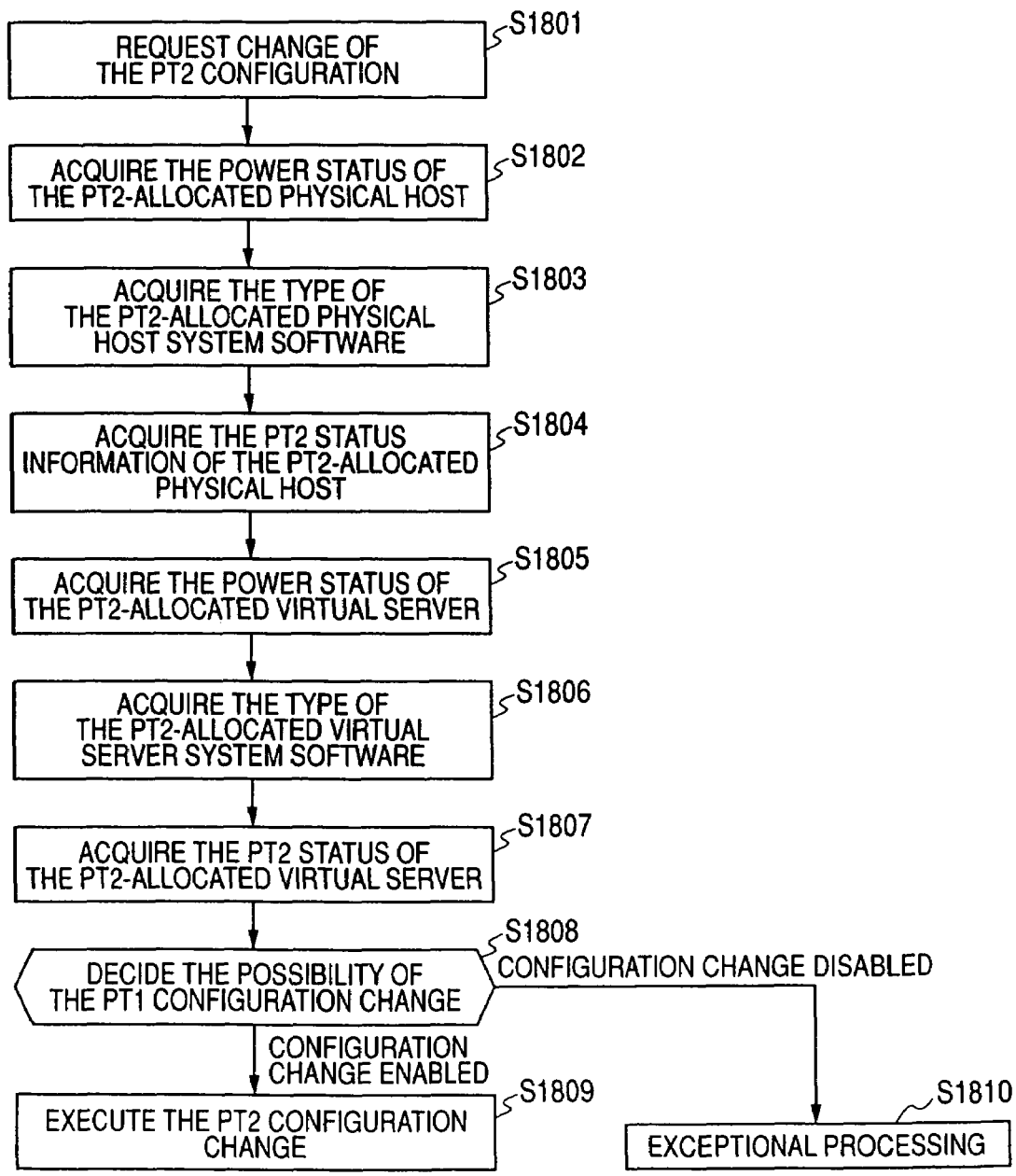
FIG. 18 is a flowchart of the processings for changing the configuration of a PCI tree allocated to the physical host 2 (in the virtual server environment) in the first embodiment of the present invention.

FIG. 18 is a flowchart of an example of how to change the configuration of a PCI tree allocated to the physical host 2 (in the virtual server environment) of the composite type computer system in the first embodiment of the present invention. As shown in FIG. 2, the physical host 2 (1002) includes three virtual servers VM1, VM2, and VM3. The procedures shown in FIG. 18 are the same as those of the steps S1701 to S1704 shown in FIG. 17, as well as those of the steps S1801 to S1804 for changing the configuration of the PCI tree allocated to the physical host 1 of the composite type computer system in the first embodiment of the present invention. So, only the processings in and after step S1805 that differ from those in FIG. 17 will be described below, avoiding redundant description.

In the example shown in FIG. 18, how to control the configuration change of the PCI tree PT2 was described. In case of a virtual server, however, the PCI manager 104 acquires the physical host management information 135 of the physical host 2 to which the PCI tree PT2 is allocated, as well as the PCI tree status information (steps S1802 to S1804), then the power statuses of the virtual servers VM1, VM2, and VM3 included in the physical host 2, the system software type, and the PCI tree status information through the PCI tree configuration change decider 138 respectively (steps S1805 to S1807). Then, the PCI manager 104 checks the information related to the physical host 2 (1002) and the virtual servers VM1, VM2, and VM3 to decide the possibility of the configuration change of the PCI tree PT2 (step S1808). Concretely, this check is made, for example, as follows. When the power status of the physical host 2 (1002) is "Active", the configuration change is disabled. When the power statuses of the virtual servers to which the PT2 is allocated, that is, the power statuses of the VM1 and VM2 are "Active" respectively as shown in FIG. 2, the configuration change is disabled. When the system software OSy in the VM1 does not correspond to the hot plug of the object PCI device, the configuration change is disabled. And when the system software VMMy does not correspond to the hot plug of the object PCI device, the configuration change is disabled.

And when the configuration change is enabled just like in the controlling shown in FIG. 17 as a result of this check, the PCI manager 104 changes the configuration of the PCI tree PT2 (step S1809). If disabled, the PCI manager 104 carries out an exceptional processing (step S1810).

The composite type computer system in this embodiment can thus control to assure that the subject system software can change the configuration of each PCI tree allocated to each computer regardless of whether the system software is active or not.

Second Embodiment

Next, there will be described a configuration of a composite type computer system in a second embodiment of the present invention. The composite type computer system in this second embodiment has only a difference from that in the first embodiment; the connection between the PCI manager 104 and each of the multi-route PCI switches 1011 and 1012 is changed. Other configuration items are the same as those in the first embodiment. So, only the difference will be described here, avoiding redundant description.

Figure 19:
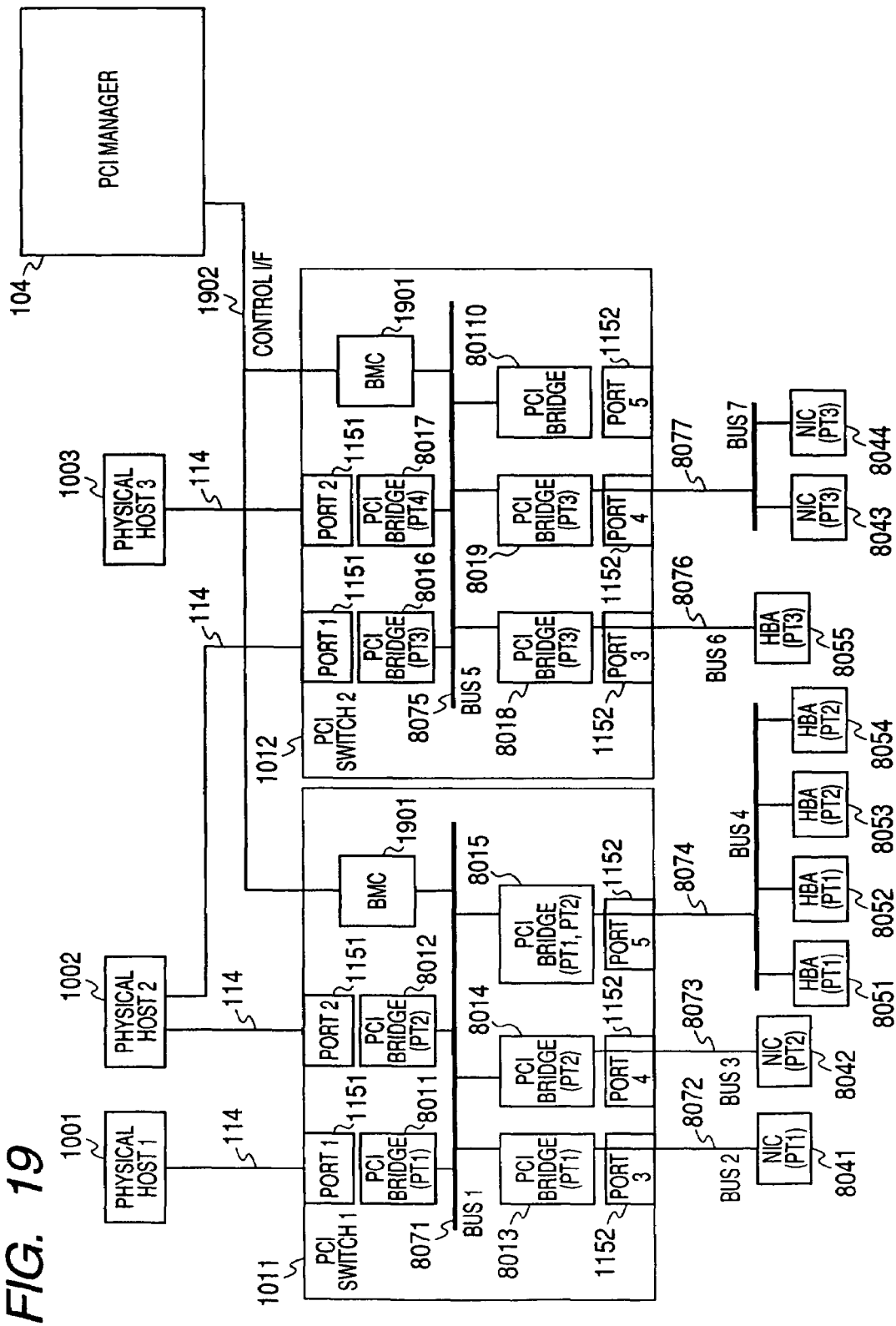
FIG. 19 is a block diagram of a PCI tree managed by a PCI manager of a composite type computer system in a second embodiment of the present invention.

FIG. 19 is a block diagram of an example of a PCI tree managed by a PCI manager 104 of a composite type computer system in a second embodiment. In this second embodiment, each of the multi-route PCI switches 1011 and 1012 includes BMCs 1901 and the PCI manager 104 is connected to each BMC 1901 through the control interface 1902. In this case, the PCI manager 104 can know the topology of each PCI device (8041 to 8055) included in each multi-route PCI switch 1011/1012 through a BMC 1901.

Third Embodiment

Next, there will be described a configuration of a composite type computer system in a third embodiment of the present invention. The composite type computer system in this third embodiment has only a difference from that in the first embodiment; the method of the physical host PCI tree status acquirer 133 for acquiring PCI tree status information differs from that in the first embodiment. Other configuration items are the same as those in the first embodiment. So, only the difference will be described here, avoiding redundant description.

Figure 20:
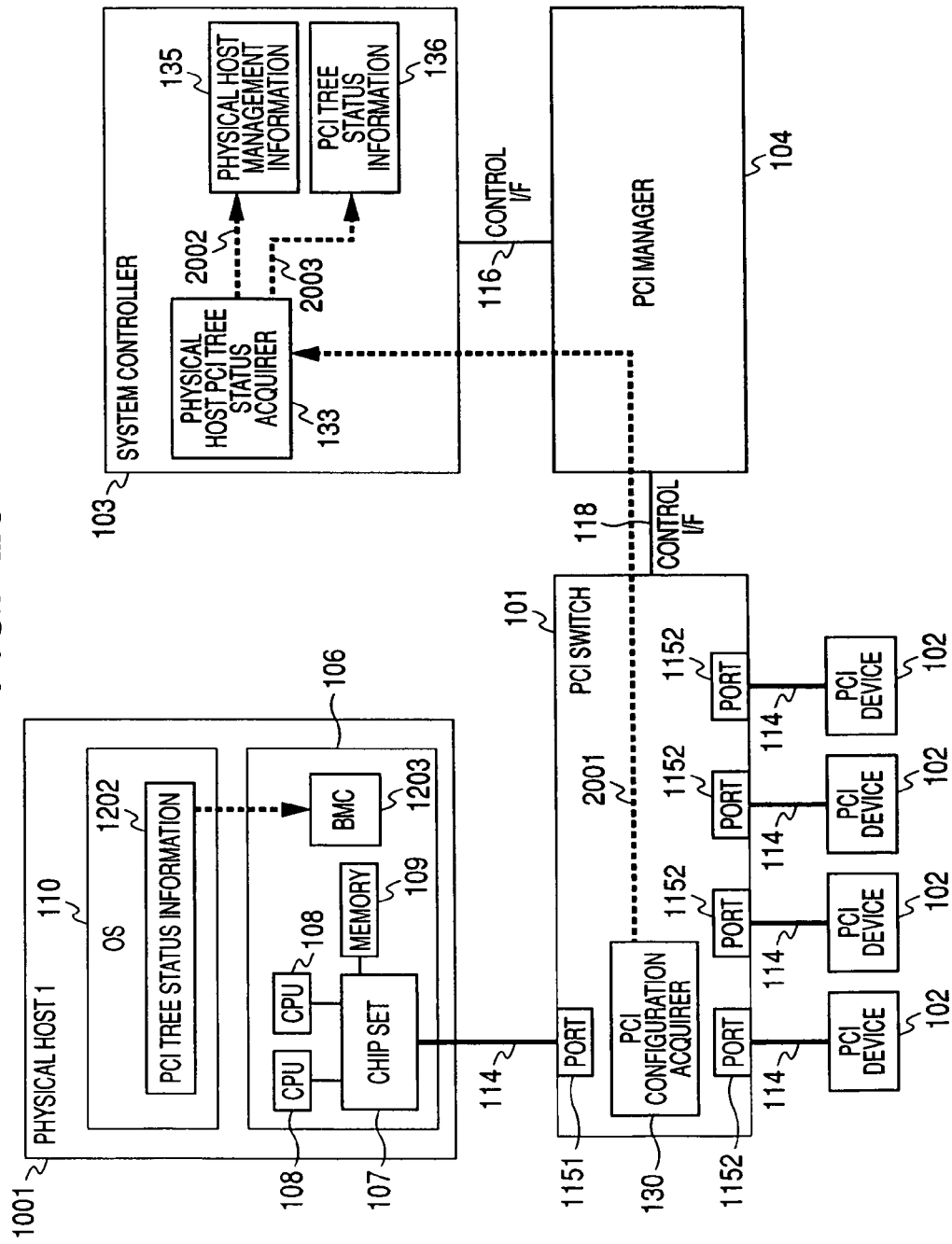
FIG. 20 is a block diagram for the processings carried by the physical host PCI tree status acquirer 133 of the composite type computer system to acquire the PCI tree status information 136 in a third embodiment of the present invention.

FIG. 20 is a block diagram of an example of how the physical host PCI tree status acquirer 133 acquires the PCI tree status information 136 in the composite type computer system in this third embodiment. In FIG. 20, only the physical host 1001, PCI switch 1011, PCI manager 104, and system controller are shown in order to simplify the description; others are omitted. In this embodiment, the system controller 103 includes a PCI tree configuration information acquirer 130 that can access the configuration register of each PCI device 102 through the multi-route PCI switch 1011 to acquire the configuration information. The physical host PCI tree status acquirer 133 of the system controller 103 acquires the PCI tree status information from the PCI tree configuration information acquirer 130 through the PCI manager 104 (route 2001). Then, the physical host PCI tree status acquirer 133 stores the PCI tree status information 136 (route 2003) and sets "Enable" in the PCI tree status information k206 in the table of the physical host management information 135 shown in FIG. 2, denoting that the PCI tree status information 136 is valid (route 2002).

Figure 21:
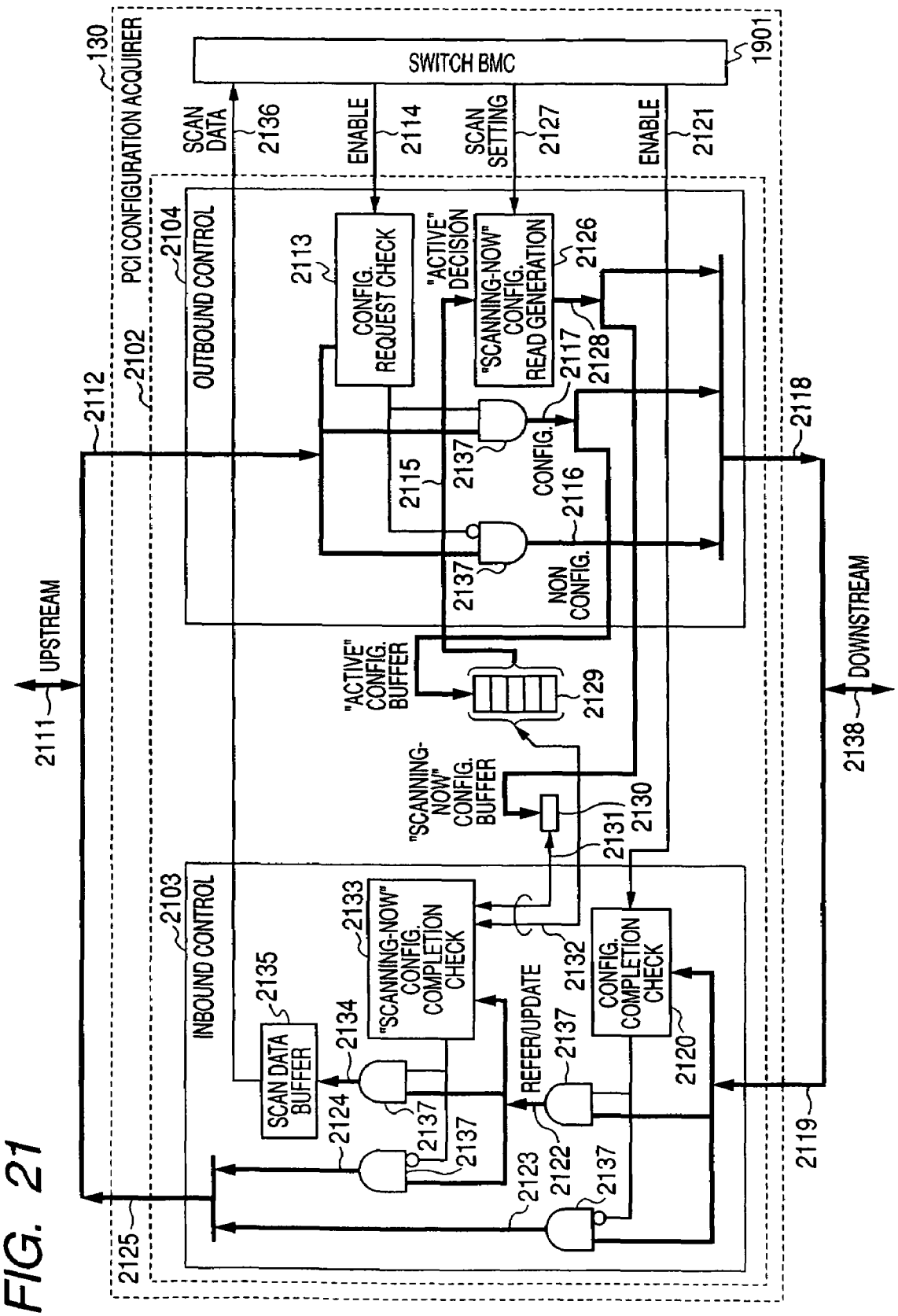
FIG. 21 is an example of the circuit diagram of the PCI tree configuration information acquirer 130 of the composite type computer system in the third embodiment of the present invention.

Next, there will be described concretely the circuit of the PCI tree configuration information acquirer 130. FIG. 21 is an example of the circuit diagram of a PCI tree configuration information acquirer 130 of the composite type computer system in this third embodiment.

In this embodiment, the PCI tree configuration information acquirer 130 includes a BMC 1901 that controls the acquirement of the PCI tree status information and a PCI sender/receiver 2102 that sends/receives PCI configuration requests.

Furthermore, the PCI sender/receiver 2102 includes an outbound controller 2104 that processes PCI transactions addressed to an upstream 2111 disposed closer to a host bus and addressed to a downstream 2138 disposed farther from the host bus; an inbound controller 2103 that processes PCI transactions addressed to the downstream 2138 and addressed to the upstream 2111; a current configuration buffer 2129 that holds the current configuration access; and a current scanning configuration buffer 2130 that holds a scanning configuration access so as to acquire the PCI tree status information 136. The reference number 2137 denotes an AND logic circuit.

If the PCI tree configuration information acquirer 130 is enabled, the BMC 1901 enables the configuration request checker 2113 and the configuration completion checker 2120 through the control interface 2114/2121. The configuration request checker 2113 identifies an object outbound PCI transaction as a configuration request and the configuration completion checker 2120 identifies an inbound PCI transaction as configuration completion. Consequently, each PCI transaction is processed as follows.

A non-configuration PCI transaction received from the upstream 2111 is transferred to the downstream 2138 through the routes 2112, 2116, and 2118.

Each configuration PCI transaction received from the upstream 2111 is transferred to the downstream 2138 through the routes 2112, 2117, and 2118, and held in the current configuration buffer 2129.

Each non-configuration PCI transaction received from the downstream 2139 is transferred to the upstream 2111 through the routes 2119, 2123, and 2125.

Each configuration completion PCI transaction received from the downstream 2138 is transferred to the scanning configuration completion checker 2133 and checked if the completion is for the configuration information received from the upstream or for the configuration information received from the PCI tree configuration information acquirer 130.

If a PCI transaction is a completion one for the configuration information received from the former upstream, the transaction is transferred to the upstream 2111 through the routes 2119, 2122, 2124, and 2125. If a PCI transaction is a completion one for the configuration information received from the PCI tree configuration information acquirer 130, the transaction is handled as follows. Hereunder, there will be described how to acquire such PCI configuration information.

Concretely, the PCI tree configuration information acquirer 130 acquires such configuration information of a PCI device 102 as follows. At first, the BMC 1901 sets the object PCI device of which information is to be acquired for the configuration read generator for scanning 2126 through the control interface 2127, that is, sets scanning. The configuration read generator 2126 then refers to the active configuration buffer 2129 to confirm that there is no configuration transaction received from the active upstream. In this case, the configuration read generator 2126 generates configuration read for scanning with respect to the object PCI device 102 and transfers it to the downstream 2138 through the routes 2128 and 2118. At the same time, this configuration read is held in the scanning configuration buffer 2130.

After this, the downstream 2138 returns the completion for the scanning configuration read to the inbound controller 2103 from the downstream 2138 through the routes 2119 and 2122. The scanning configuration completion checker 2133 then refers to the current configuration buffer 2129 and the scanning configuration buffer 2130 to identify that the configuration completion is for scanning.

The scanning configuration completion checker 2133 then deletes the entry corresponding to the configuration information held in the current configuration buffer 2129 or scanning configuration buffer 2130 to update the configuration information.

The completion of the scanning configuration completion is transferred from the scanning data buffer 2153 through the routes 2134 and 2136 to the BMC 1901. Consequently, the BMC 1901 comes to be enabled to acquire the configuration information of the object PCI device 102.

Fourth Embodiment

Next, there will be described how to control a composite type computer system in a fourth embodiment of the present invention. The method that controls the composite type computer system in this fourth embodiment has only a difference from that of the first embodiment; a step of checking the policy set by the user or system manager to decide the possibility of powering the physical host 1001/1002 is just added to the method that controls the composite type computer system in the first embodiment shown in FIGS. 11 and 16. Others in this fourth embodiment are the same as those in the first embodiment. In this fourth embodiment, therefore, only the difference will be described, avoiding redundant description.

Figure 22:
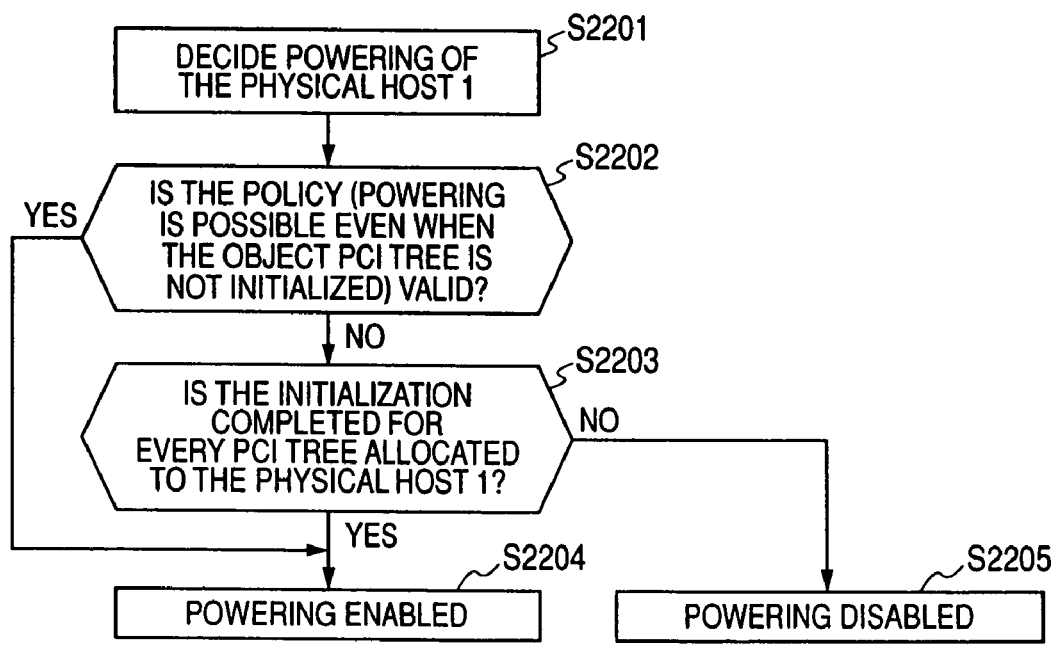
FIG. 22 is a flowchart of the processings for deciding powering to a physical host of a composite type computer system in a fourth embodiment of the present invention.

FIG. 22 is a flowchart of an example of the processing to determine whether to power an object physical host of the composite type computer system in this fourth embodiment of the present invention. In step S1103 shown in FIGS. 11 and 16 in the first embodiment, the system controller 103 begins to decide whether to power the physical host 1 (1001) (step S2201). Concretely, the system controller 103 checks the setting of the policy for powering the physical host 1 (1001) for validity (step S2202). If the policy setting is valid, the system controller 103 decides that the powering is enabled (step S2204). If not valid, the system controller 103 decides whether or not the initialization is completed for every PCI tree allocated to the physical host 1 (1001) (step S2203). If the condition is satisfied, the system controller 103 decides that the powering is enabled (step S2204). If not, the system controller decides that the powering is disabled (step S2205).

This fourth embodiment is common to both the non-virtual server environment and the virtual server environment. This fourth embodiment enables the user or system manager to decide whether to power the object physical host according to his/her set policy.

Fifth Embodiment

Next, there will be described how to control a composite type computer system in a fifth embodiment of the present invention. The method that controls the composite type computer system in this fifth embodiment also has only one difference from that of the first embodiment; concretely, a processing to decide the possibility of the configuration change of an object PCI tree according to the user or system manager set policy is just added to the method in the first embodiment shown in FIGS. 17 and 18. Other items are the same as those in the first embodiment. In this fifth embodiment, therefore, only the difference will be described, avoiding redundant description.

Figure 23:
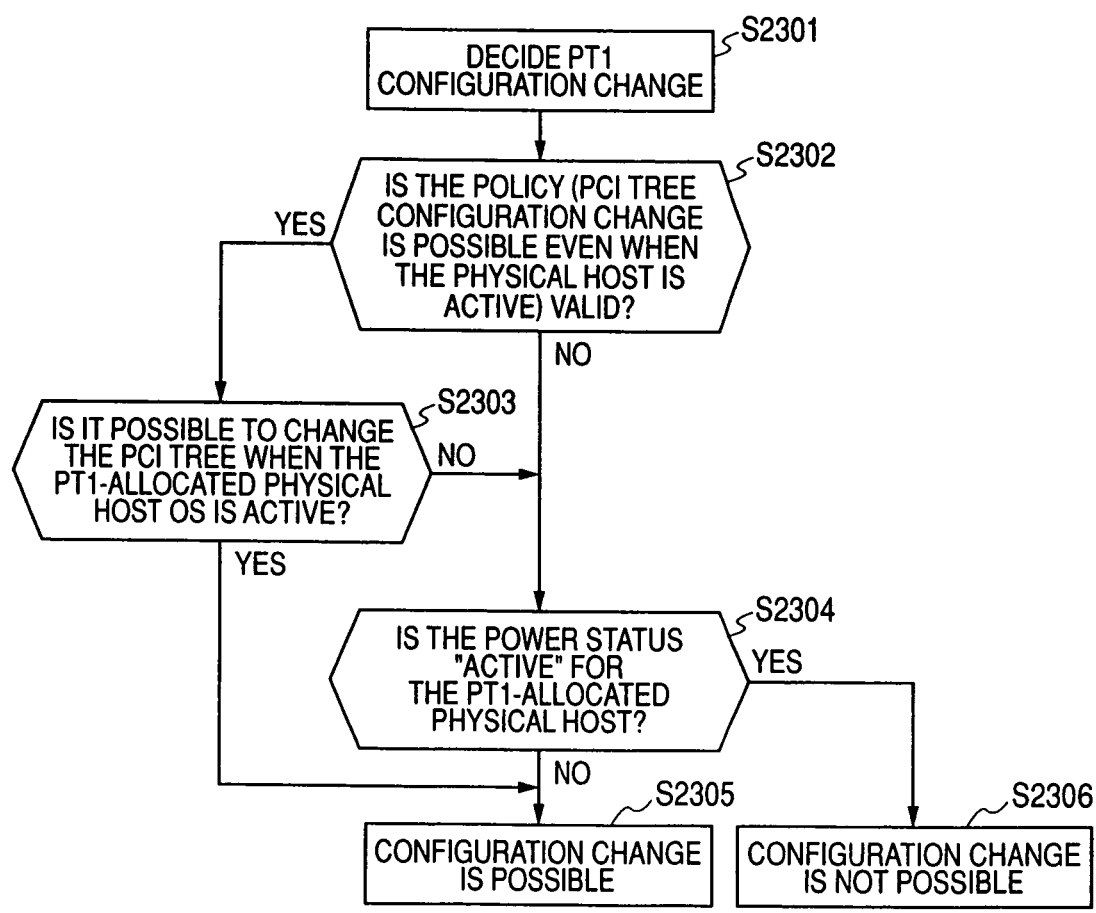
FIG. 23 is a flowchart of the processings for deciding the possibility of changing the configuration of a PCI tree allocated to a physical host 1 (in the non-virtual server environment) of a composite type computer system in a fifth embodiment of the present invention.
Figure 24:
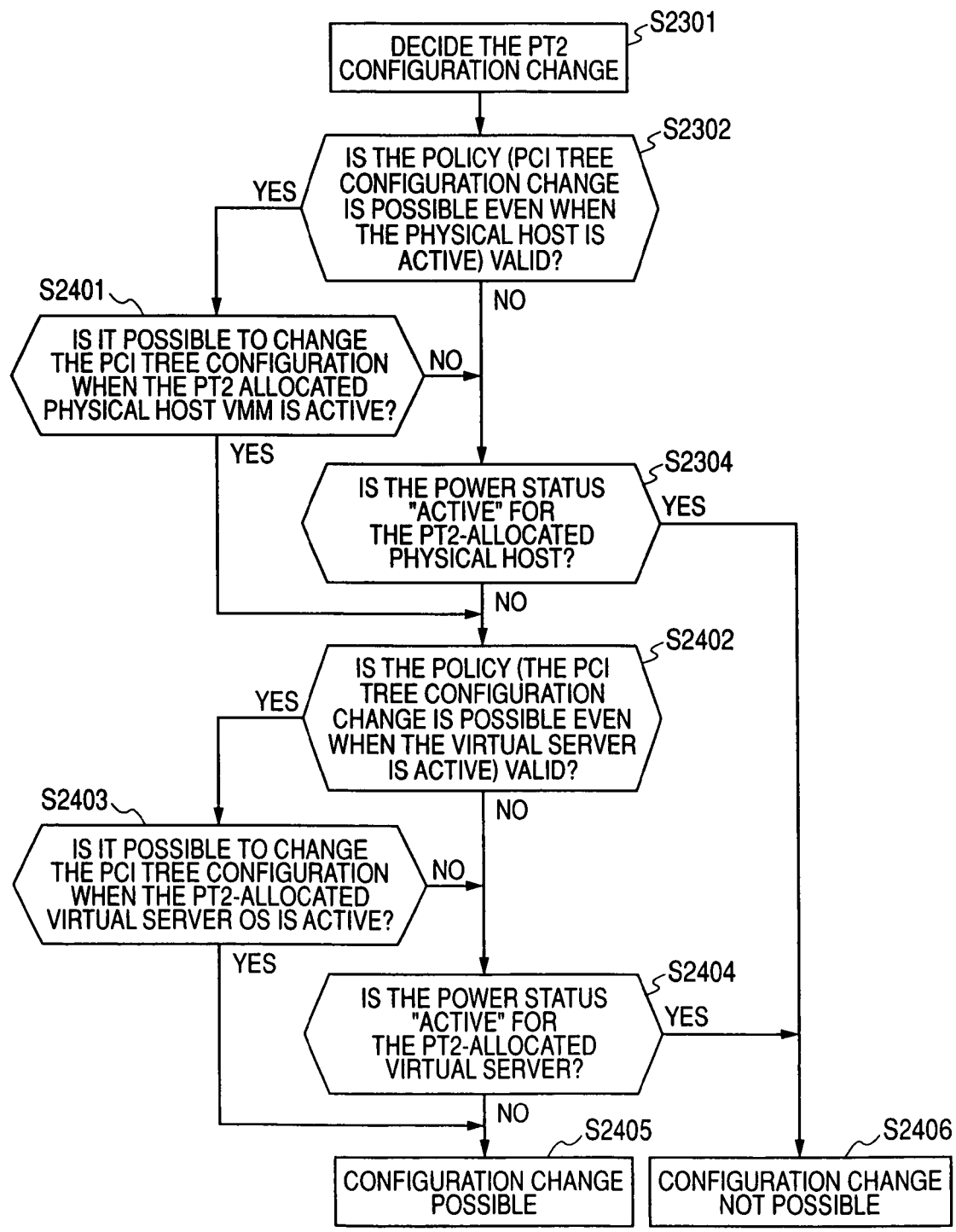
FIG. 24 is a flowchart of the processings for deciding the possibility of changing the configuration of a PCI tree allocated to the physical host 2 (in the virtual server environment) of the composite type computer system in the fifth embodiment of the present invention.

FIG. 23 is a flowchart of an example of the processing to determine the possibility of the configuration change of a PCI tree allocated to the physical host 1 (in the non-server environment) of the composite type computer system in this fifth embodiment of the present invention. FIG. 24 is a flowchart of an example of the processing to determine the possibility of the configuration change of a PCI tree allocated to the physical host 2 (in the server environment) of the composite type computer system in this fifth embodiment of the present invention.

As shown in FIG. 23, if the physical host 1001 is found to be in the non-server environment, the system controller 103 begins to decide whether to change the configuration of the PCI tree PT1 of the physical host 1 (1001) in step S1705 shown in FIG. 17 (step S2301). Then, the PCI manager 104 checks the policy setting to determine whether or not the policy enables the configuration change of the PCI tree even when physical host 1 is active (step S2302). If enable, the PCI manager 104 then checks the type of the OS 110 that runs in the physical host 1 (1001) to which the PCI tree PT1 is allocated to decide the possibility of the configuration change of the PCI tree (step S2303). If the check result is "Active" and the configuration change of the PCI tree is enabled, the PCI manager 104 decides the setting as "enable" (step S2305). If not enable or the check result in step S2303 is "Active" and the configuration change of the PCI tree is disabled, the PCI manager 104 checks whether or not "Active" is set for the power supply status of the physical host 1 (1001) to which the PCI tree PT1 is allocated. If the check result is "Active", the PCI manager decides that configuration change is disabled (step S2306). On the other hand, if the power status of the physical host 1 (1001) is not "Active", the PCI manager decides the setting as "Enable" (step S2305).

And as shown in FIG. 24, if the object physical host is found to be in the virtual server environment, the system controller 103 begins to decide whether to change the configuration of the PCI tree of the physical host 2 (1002) in step S1804 shown in FIG. 18 (step S2301).

The PCI manager 104 then decides whether or not the policy enables the configuration change of the PCI tree even when the physical host is active (step S2302). If enable, the PCI manager 104 then checks the type of the VMM 111 that runs in the physical host 2 (1002) to which the PCI tree PT1 is allocated to decide the possibility of the configuration change of the PCI tree in the active status (step S2401).

If the check result is "Disable" in step S2302, or if the configuration change of the PCI tree is disabled even in the active status, the PCI manager 104 checks whether or not "Active" is set for the power status of the physical host 2 (1002) to which the PCI tree PT2 is allocated (step S2304). If the check result is "Active", the PCI manager decides the setting as "Disable" (step S2406).

If the check result is "Disable" in step S2401 even when the VMM 111 is active or if the VMM 111 is not active in step S2304, the PCI manager checks the policy setting whether or not "Enable" is set for PCI configuration change even when the virtual server 112 included in the physical host 2 (1002) is active (step S2402). If the check result is "Enable", the PCI manager 104 then checks the type of the OS 113 that runs in the virtual server 112 to which the PCI tree PT2 is allocated to decide the possibility of the PCI tree configuration change in the active status (step S2403).

If the status is active and the check result is "Enable", the PCI manager decides that the configuration change is possible (step S2405). If the check result is "Disable" in step S2402 or if it is decided in step S2403 that the status is active and the check result is "Disable", the PCI manager 104 checks the power status of the virtual server 112 to which the PCI tree PT2 is allocated to decide whether or not it is active. If one or more virtual servers 112 are active, the PCI manager 104 decides the setting as "Disable" (step S2406).

On the other hand, if all the virtual servers 112 are not active, the PCI manager decides the setting as "Enable" (step S2405). This embodiment can thus enable the user or system manager to decide the possibility of the PCI tree configuration change in accordance with his/her set policy.

Sixth Embodiment

Next, there will be described a configuration of a composite type computer system in a sixth embodiment of the present invention. In this sixth embodiment, there are only two differences from the configuration of the composite type computer system in the first embodiment; the PCI manager 104 and the system controller 103 are disposed in difference places from those in the composite type computer system in the first embodiment shown in FIG. 1. Other components are the same as those in the first embodiment. In this sixth embodiment, therefore, only the two differences will be described, avoiding redundant description.

Figure 25:
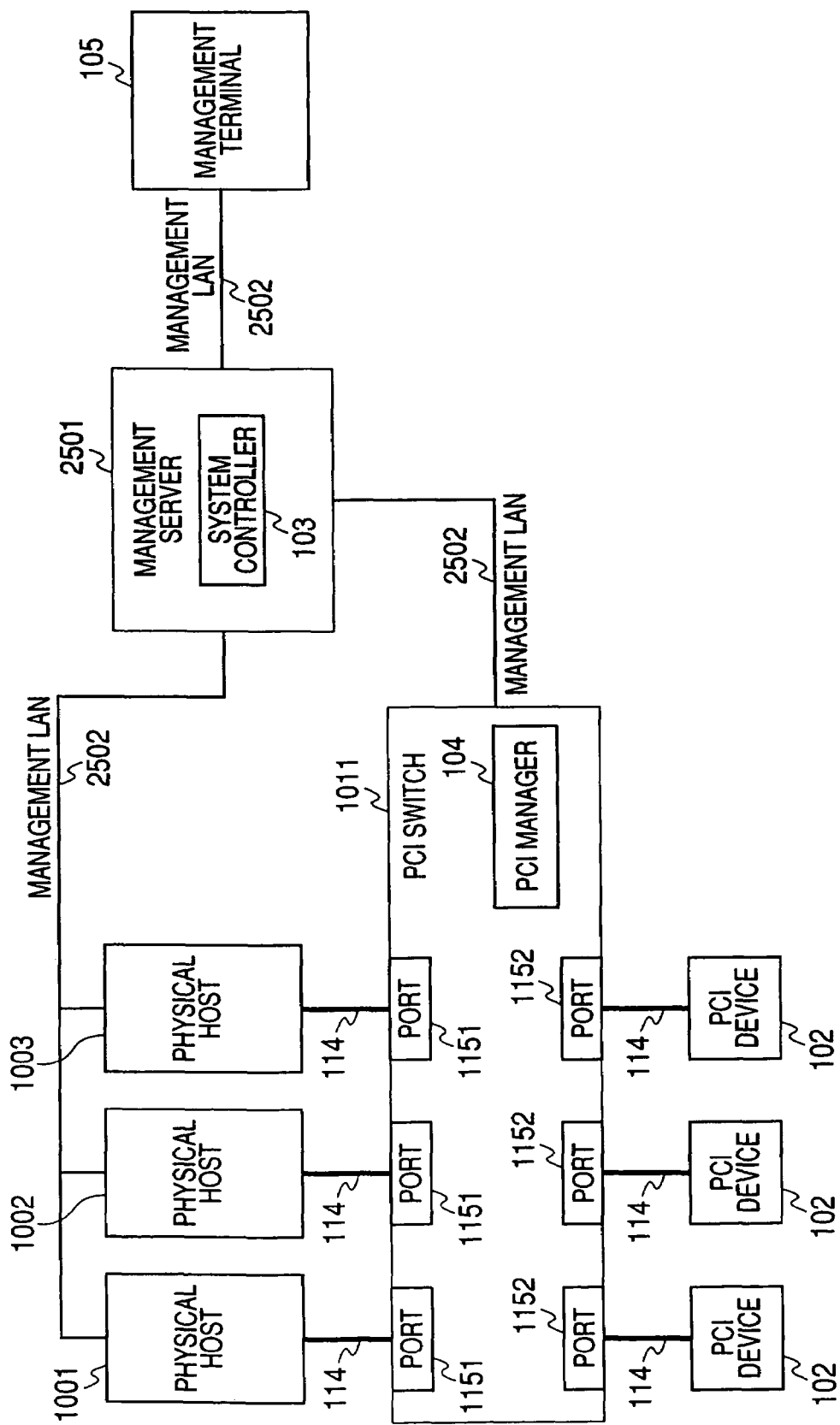
FIG. 25 is a block diagram of a composite type computer system in a sixth embodiment of the present invention.

FIG. 25 is a block diagram of the composite type computer system in this sixth embodiment. As shown in FIG. 25, the PCI manager 104 is disposed in the multi-route PCI switch 1011 and the system controller 103 is disposed in the management server 2501 that manages the physical hosts 1001, 1002, and 1003, which are computers. The management server 2501, physical hosts 1001, 1002, and 1003, the management server 2501, the multi-route PCI switch 1011, the management server 2501, and the management terminal 105 are connected to each another through the management LAN 2502. The present invention in this embodiment can also apply to a system that includes a rack type server or pedestal type server and a multi-route PCI switch.

Seventh Embodiment

Next, there will be described a configuration of a composite type computer system in a seventh embodiment of the present invention. In this seventh embodiment, there are only two differences from the configuration of the composite type computer system in the first embodiment shown in FIG. 1; the PCI manager 104 and the system controller 103 are disposed in difference places from those in the composite type computer system in the first embodiment. Other components are the same as those in the first embodiment. In this seventh embodiment, therefore, only the two differences will be described, avoiding redundant description.

Figure 26:
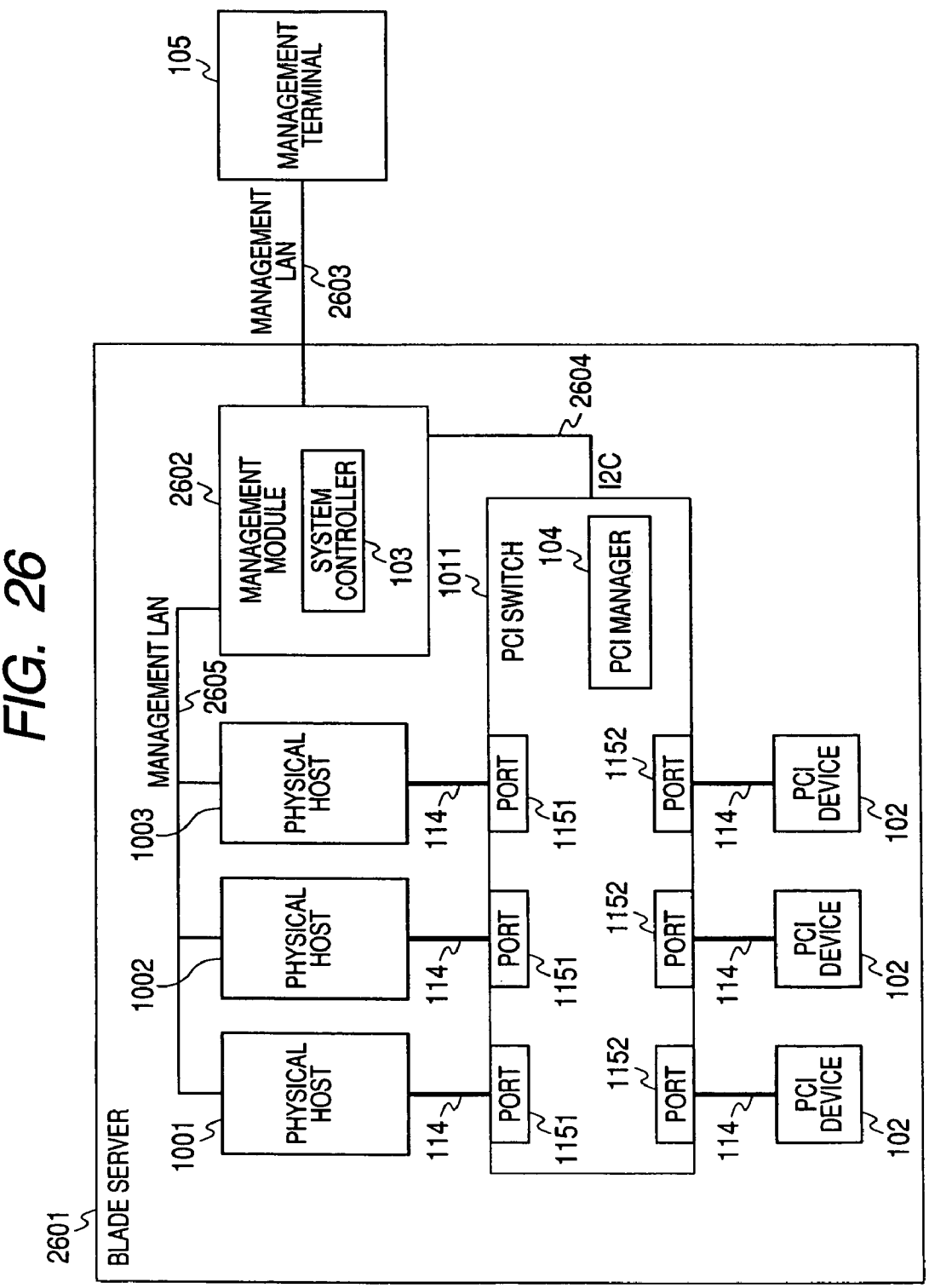
FIG. 26 is a block diagram of a composite type computer system in a seventh embodiment of the present invention.

FIG. 26 is a block diagram showing a configuration of the composite type computer system in this seventh embodiment. As shown in FIG. 26, in this embodiment, the blade server 2601 consists of plural physical hosts 1001, 1002, and 1003; a multi-route PCI switch 1011; a PCI device 102; and a management module 2602 that manages the physical hosts 1001, 1002, and 1003, the multi-route PCI switch 1011, the PCI device, etc. The multi-route PCI switch 1012 in the first embodiment is omitted from this FIG. 26.

The PCI manager 104 is disposed in the multi-route PCI switch 1011 and the system controller 103 is disposed in the management module 2602. The management module 2602 and the physical hosts 1101 to 1103 are connected to each another through the management LAN 2605. The management module 2602 and the multi-route PCI switch 1011 are connected to each other through an I²C 2604 and the management module 2602 and the management terminal 105 are connected to each other through the management LAN 2603.

Therefore, the present invention in this embodiment can also apply to a blade type server system that includes multi-route PCI switches 1011 and 1012.

Eighth Embodiment

Next, there will be described a configuration of a composite type computer system in an eighth embodiment of the present invention. In this eighth embodiment, there are only two differences from the configuration of the composite type computer system in the first embodiment shown in FIG. 1; the PCI manager 104 and the system controller 103 are disposed in difference places from those in the composite type computer system in the first embodiment. Other components are the same as those in the first embodiment. In this eighth embodiment, therefore, only the differences will be described, avoiding redundant description.

Figure 27:
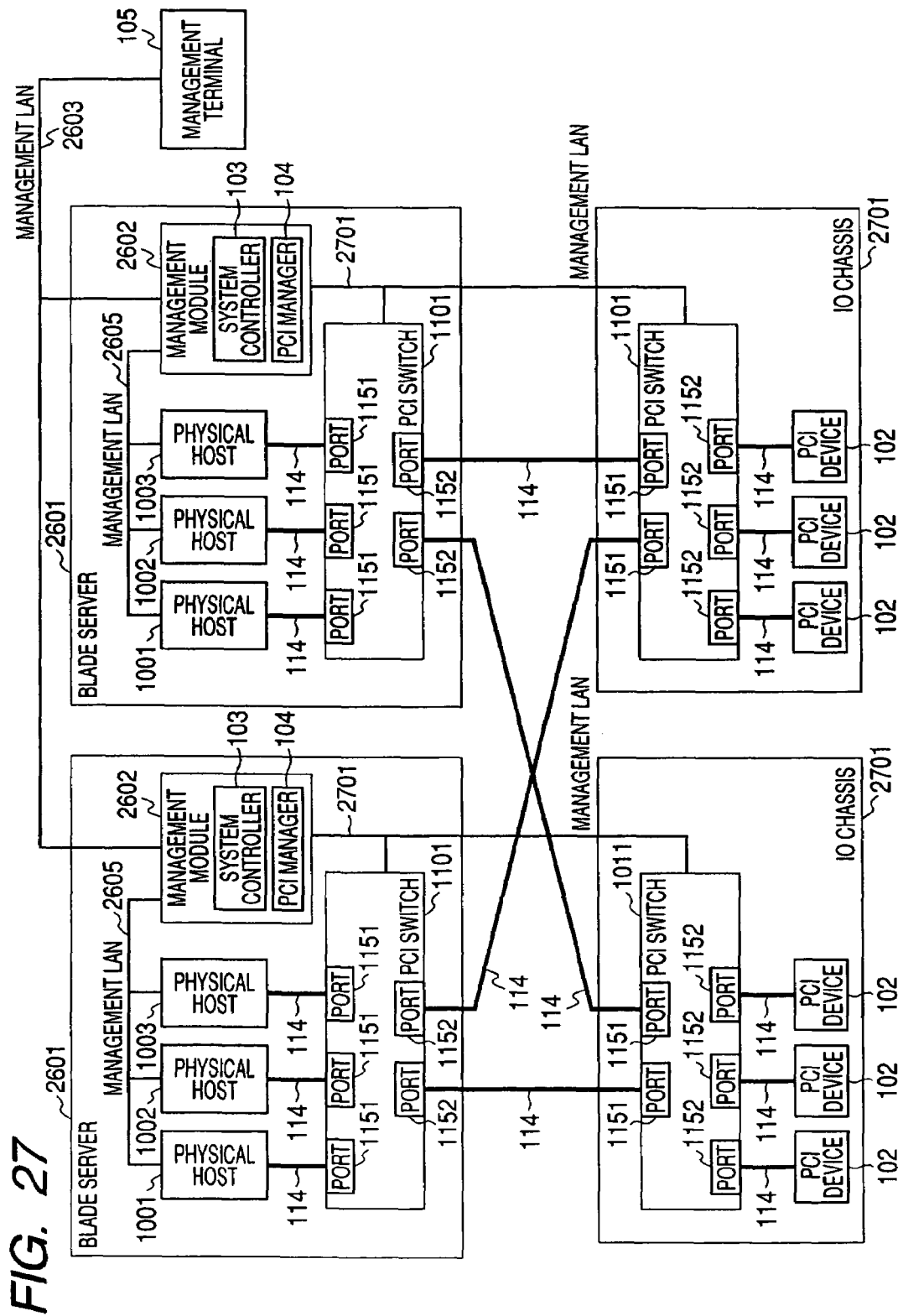
FIG. 27 is a block diagram of a composite type computer system in an eighth embodiment of the present invention.

FIG. 27 is a block diagram showing a configuration of the composite type computer system in this eighth embodiment. As shown in FIG. 27, in this embodiment, the composite type computer system consists of plural blade servers 2601; plural IO chassis 2701; and a management terminal 105. Each blade server 2601 consists of plural physical hosts 1001, 1002, and 1003; a multi-route PCI switch 1011; and a management module 2602. The multi-route PCI switch 1012 in the first embodiment is omitted from this FIG. 27.

Each IO chassis 2701 consists of a multi-route PCI switch 1011 and plural PCI devices 102. A PCI Express (e.g., a cable or the like) is used for the connection between the multi-route PCI switches 1011. The management module 2602 and each multi-route PCI switch 1011 is connected to each other through the management LAN 2701 and the plural management modules and the management terminal 105 are connected to each another through the management LAN 2603.

Therefore, the present invention in this embodiment can also apply to a system composed of a blade server that includes the multi-route PCI switches 1011 and 1012, as well as an IO chassis.

Ninth Embodiment

Next, there will be described a configuration of a composite type computer system in a ninth embodiment of the present invention. In this eighth embodiment, there is only one difference from the configuration of the composite type computer system in the first embodiment shown in FIG. 1; the configuration of the graphical interface of the management terminal 105 is modified from that in the first embodiment. Other components are the same as those in the first embodiment. In this eighth embodiment, therefore, only the difference will be described, avoiding redundant description.

Figure 28:
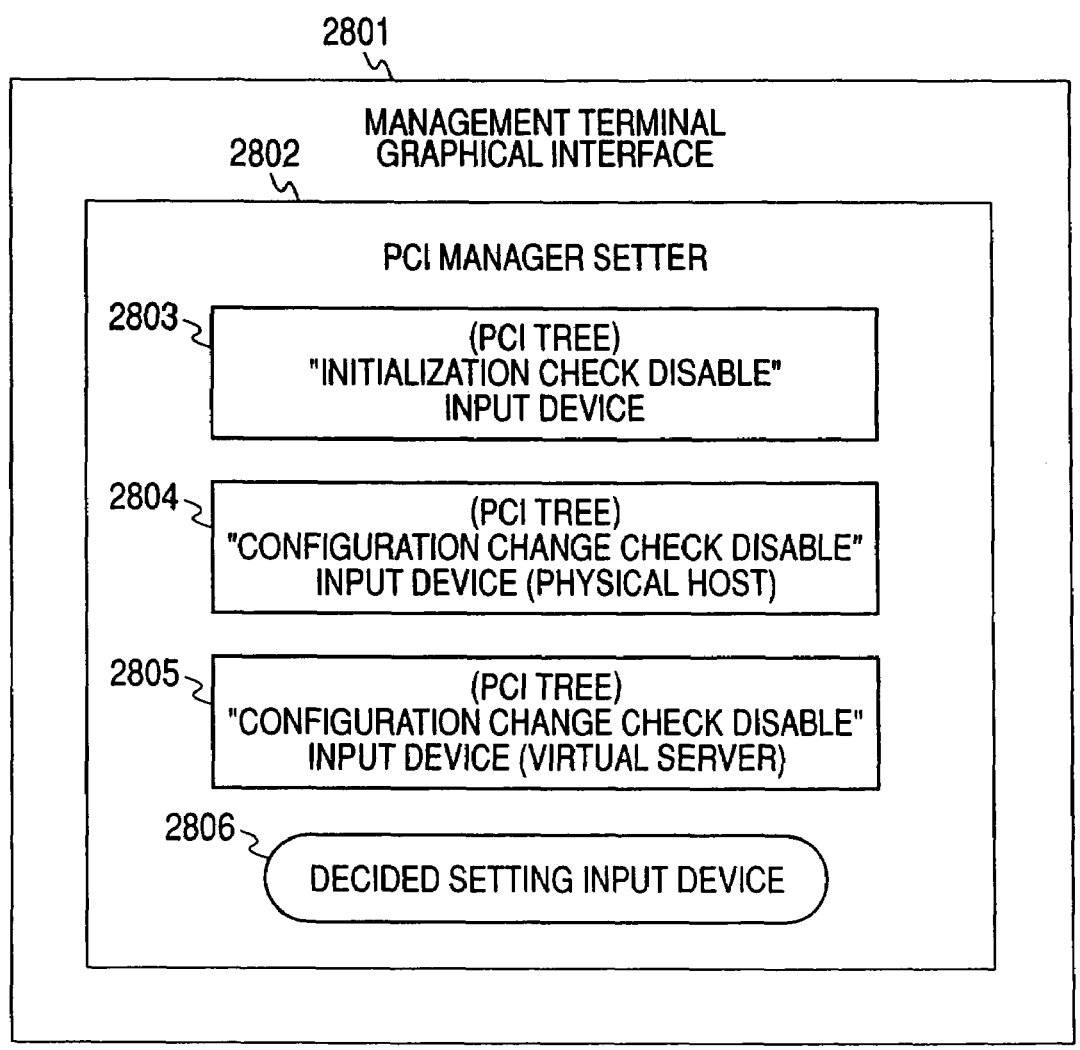
FIG. 28 is a block diagram of a graphical interface of a management terminal in a ninth embodiment of the present invention.

FIG. 28 is an example of the configuration of the graphical interface of the composite type computer system in this ninth embodiment. As shown in FIG. 28, the graphical interface 2801 of the management terminal 105 includes a PCI manager setting device 2802 used to set the PCI manager. The graphical interface 2801 of the management terminal 105 includes at least a PCI tree initialization check on/off input device 2803 used to set whether to check the initialization status of the object PCI tree upon powering the physical host 1001/1002; a physical host PCI tree configuration change check on/off input device 2804 used to set whether to check the status of the physical host 1001/1002 upon changing the configuration of a PCI tree allocated to the physical host 1001/1002; a virtual server PCI tree configuration change check on/off input device 2805 used to set whether to check the status of the physical host 1001/1002 upon changing the configuration of a PCI tree allocated to the virtual server 112; and a setting decision input device 2806.

The input devices 2803 to 2806 of the PCI manager 2802 may be only one for the composite type computer system or they may be provided for each of the physical hosts 1001 and 1002 in the system.

While the preferred forms of the present invention have been described, it is to be understood that modifications will be apparent to those skilled in the art without departing from the spirit of the invention.

The present invention can apply to a composite type computer system capable of varying allocation of PCI devices to computers, that is, to a computer system that uses a multi-route PCI switch.

What is claimed is:

1. A method that manages a computer system that includes a plurality of computers, each having a CPU, a memory, and a PCI interface, one or more PCI switches used to connect those computers through the PCI interfaces, a plurality of PCI devices connected to the PCI switch, a system controller that controls the computers, and a PCI manager that controls allocation of the PCI devices to the computers, in the system controller, comprising the steps of:
managing allocation of the computers and the PCI manager;
(a) powering one of the plurality of computers to start up its operation system;
(b) acquiring a PCI tree identifier and PCI tree management information denoting the status of the PCI tree from the PCI manager with respect to the PCI tree denoting a topology of a PCI device allocated to the computer;
(c) retrying powering of the computer or canceling the powering if the acquired PCI tree management information denotes that the PCI tree is being initialized or not initialized yet; and
(d) powering the computer if the PCI management information denotes completion of the PCI tree initialization.

2. The method according to claim 1,
wherein the step of powering one of the plurality of computers to start up its operation system includes a step of detecting completion of the operating system start-up through the computer;
wherein the step of acquiring the PCI tree identifier and the PCI tree management information that denotes the status of the PCI tree from the PCI manager with respect to the PCI tree denoting the topology of the PCI device allocated to the computer includes the steps of:
(a) acquiring PCI tree status information that includes a PCI tree of a PCI device recognized by the operation system and PCI device type information; and
(b) acquiring PCI tree configuration information that includes allocation of the PCI device to the computer, as well as the setting information of the PCI switch;
wherein the system controller further carries out processings in the steps of:
(a) calculating a PCI tree recognized by the computer operation system from the PCI tree configuration information and compares the status of the actual PCI tree with the PCI tree recognized by the operation system; and
(b) shutting down the operation system to shut down the power to the computer if both PCI trees do not match in status as a result of the comparison.

3. The method according to claim 2,
wherein the method further comprising the steps of:
(a) enabling the PCI manager to acquire the power status of the computer to which a PCI tree of which configuration is to be changed is allocated when the configuration change includes any of addition or deletion of a PCI device with respect to the PCI tree allocated to the computer;
(b) enabling the PCI manager to acquire the type of the operating system that runs in the computer;
(c) enabling the PCI manager to check the power status and the operating system type of the computer to decide the possibility of configuration change of the PCI tree; and
(d) enabling the PCI manager to cancel the configuration change if the PCI tree configuration change is disabled as a result of the check.

4. The method according to claim 1,
wherein the computer includes a virtual machine monitor that generates a plurality of virtual servers;
wherein the step of enabling the system controller to power one of the computers to start up its operation system includes a step of:
(a) powering one of the computers to start up the virtual machine monitor, then configuring one or more virtual servers and starting up operating systems in those virtual servers.

5. The method according to claim 4,
wherein the step of powering one of the computers to start up the virtual machine monitor, then generating one or more virtual servers and starting up operating systems in those virtual servers includes a step of:
(a) enabling the system controller to detect completion of the virtual machine monitor start-up through the computer;
wherein the step of enabling the system controller to acquire the PCI tree identifier and the PCI tree management information denoting the PCI tree status from the PCI manager with respect to the PCI tree denoting the topology of the PCI device allocated to the computer includes the steps of:
(a) enabling the system controller to acquire the PCI tree status information including the PCI tree of the PCI device recognized by the virtual machine monitor and the PCI device type information; and
(b) enabling the system controller to acquire the PCI tree configuration information including the allocation of the computer and the PCI device, as well as the switch setting information;
wherein the system controller further carries out processings in steps of:
(a) calculating a PCI tree recognized by the virtual machine monitor of the computer from the PCI tree configuration information, then comparing the actual PCI tree status information with the PCI tree recognized by the virtual machine monitor; and
(b) shutting down the virtual machine monitor to turn off the power to the computer if the comparison result is "not matching" and configuring one or more virtual servers and starting up operating systems in those virtual servers if the comparison result is "matching".

6. The method according to claim 5,
wherein the method further includes the steps of:
(a) enabling the PCI manager to acquire the power status of the computer to which a PCI tree of which configuration is to be changed is allocated with respect to the PCI tree allocated to the computer when the configuration change includes any of addition or deletion of a PCI device;
(b) enabling the PCI manager to acquire the type of the virtual machine monitor that operates in the computer;
(c) enabling the PCI manager to acquire the power status of every virtual server to which the PCI tree of which configuration is to be changed is allocated;
(d) enabling the PCI manager to acquire the type of the operating system that runs in every virtual server;
(e) checking the acquired power status of the computer, the type of the virtual machine monitor, the power status of each of the virtual servers, and the type of the operating system to decide the possibility of the configuration change of the PCI tree; and
(f) enabling the PCI manager to cancel the configuration change if the PCI configuration change is disabled as a result of the check.

7. The method according to claim 1,
wherein the step of enabling the system controller to retry or cancel the powering of the computer if the acquired PCI tree management information denotes "initializing" or "not completed" includes a step of:
(a) powering the computer when the PCI tree management information denotes "initializing" if the powering is enabled even when the PCI tree management information denotes "initializing".

8. The method according to claim 7,
wherein the computer includes a virtual machine monitor that generates a plurality of virtual servers;
wherein the method further includes a step of:
(a) enabling the PCI manager to change the configuration of the PCI tree when the computer status is active while the PCI tree configuration change is enabled even when the computer status is active if the configuration change includes addition or deletion of a PCI device of a PCI tree allocated to the computer.

9. The method according to claim 7,
wherein the computer includes a virtual machine monitor that generates a plurality of virtual servers;
wherein the method further includes a step of:
(a) enabling the PCI manager to change the configuration of the PCI tree when the virtual server status is active while the PCI tree configuration change is enabled even when the status of every virtual server allocated to the computer is active if the configuration change includes addition or deletion of a PCI device of a PCI tree allocated to the computer.

10. A computer system, comprising:
a plurality of computers, each having a CPU, a memory, and a PCI interface;
one or more PCI switches used to connect the computers through the PCI interfaces;
a plurality of PCI devices connected to the PCI switches;
a system controller that controls the computers; and
a PCI manager that controls the allocation of the PCI devices to the computers,
wherein the system controller includes physical host management information composed of status information of a PCI tree recognized by each operating system that runs in each of the computers, a PCI tree identifier denoting at least the computer identifier and a topology of the PCI device allocated to the computer, the power status of the computer, and the type of each operating system that runs in each computer;
wherein the PCI manager includes:
PCI management information composed of at least the identifier of the PCI switch, the port number of the PCI switch, the identifier of the PCI tree allocated to the port, and the initialization status of the PCI tree; and PCI tree configuration information denoting the topology of every PCI device managed by the PCI manager; and wherein the system controller, when powering one of the computers to start it up, includes:

a PCI tree identifier acquirer that acquires the identifier of the PCI tree allocated to the computer from the PCI manager;

a physical host start-up decider that acquires the initialization status of the PCI tree from the PCI manager to decide the possibility of the powering of the computer;

a PCI tree status information acquirer that acquires the PCI tree status information from the computer; and a PCI tree checker that acquires the PCI tree configuration information from the PCI manager to calculate a PCI tree recognized by the operating system that runs in the computer or by the virtual machine monitor, then compares the calculated PCI tree with the PCI status information to check if the comparison result is "matching".

11. The computer system according to claim 10, wherein the PCI manager includes a PCI tree configuration change decider that, when addition and/or deletion of a PCI device is included in the PCI tree configuration change to be carried out for a PCI tree allocated to the computer, acquires the power status of the computer or virtual server to which the PCI tree of which configuration is to be changed is allocated and the type of the operation system that runs in the computer or the type of the virtual machine monitor from the system controller, then decides whether or not the configuration change of the PCI tree can be made.

12. A computer system, comprising:

a plurality of computers, each having a CPU, a memory, and a PCI interface;

one or more PCI switches used to connect the computers through the PCI interfaces;

a plurality of PCI devices connected to the PCI switches;

a system controller that controls the computers;

a PCI manager that controls allocation of the PCI devices to the computers; and a management terminal that controls the PCI manager and the system controller, wherein the computer system sets necessary data through a user interface of the management terminal;

wherein the user interface includes at least one or more of first, second, and third items:

wherein the first item is required to set whether to decide the possibility of powering a computer by checking the initialization status of a PCI tree allocated to the computer upon powering the computer to start it up;

wherein the second item is required to set whether to decide the possibility of the configuration change of a PCI tree by checking the power status of the computer and the type of the operating system that runs in the computer upon carrying out a configuration change that includes any of addition and deletion of a PCI device of a PCI tree allocated to the computer; and wherein the third item is required to set whether to decide the possibility of the configuration change of a PCI tree by checking the power status of the computer, the type of the virtual machine monitor that operates in the computer, the power status of every virtual server included in the virtual machine monitor, and the type of the operating system that runs in the virtual server upon carrying out a configuration change that includes any of addition and deletion of a PCI device of a PCI tree allocated to the computer.

13. The computer system according to claim 12, wherein the PCI switch includes a PCI tree configuration information acquirer that acquires topology information of each of a plurality of PCI trees configured by one or more PCI switches respectively; and wherein the PCI switch, when detecting a request for acquiring the status information of a specific PCI tree from the system controller, acquires the configuration information of the PCI tree and notifies the information to the system controller.

14. The computer system according to claim 13, wherein the system further includes a management server connected to the computers, the PCI switches, and a management LAN and used to manage the computers; and wherein the management server includes the system controller while the PCI switch includes the PCI manager.

15. The computer system according to claim 13, wherein the computers, the PCI switches, and a management module connected to the management LAN and used to manage the computers are integrated into one case;

wherein the management module includes the system controller while the PCI switch includes the PCI manager; and wherein the management module and the PCI switch are connected to each other through a control interface.

* * * * *